(12) United States Patent
Zhang et al.

(10) Patent No.: US 9,426,338 B2
(45) Date of Patent: *Aug. 23, 2016

(54) IMAGING APPARATUS AND IMAGE FORMING APPARATUS HAVING CONTINUOUS PORES IN THREE DIMENSIONS IN POROUS BODY

(71) Applicant: CANON KABUSHIKI KAISHA, Tokyo (JP)

(72) Inventors: Zuyi Zhang, Yokohama (JP); Yoshinori Kotani, Yokohama (JP); Akira Sugiyama, Yokohama (JP); Kenji Takashima, Tokyo (JP); Naoyuki Koketsu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/321,479

(22) Filed: Jul. 1, 2014

(65) Prior Publication Data

US 2014/0313391 A1    Oct. 23, 2014

Related U.S. Application Data

(63) Continuation of application No. 13/532,288, filed on Jun. 25, 2012, now Pat. No. 8,804,140.

(30) Foreign Application Priority Data

Jun. 30, 2011  (JP) .................................. 2011-146512
Jun. 1, 2012   (JP) .................................. 2012-126379

(51) Int. Cl.
*G06F 15/00*  (2006.01)
*G06F 3/12*   (2006.01)
*G06K 1/00*   (2006.01)
*H04N 5/225*  (2006.01)
*C03C 11/00*  (2006.01)
*G02B 27/00*  (2006.01)
*G03B 11/00*  (2006.01)
*G06K 15/02*  (2006.01)
*H04N 1/193*  (2006.01)

(52) U.S. Cl.
CPC ............ *H04N 5/2251* (2013.01); *C03C 11/005* (2013.01); *G02B 27/0006* (2013.01); *G03B 11/00* (2013.01); *G06K 15/02* (2013.01); *H04N 1/193* (2013.01); *G03B 2205/0061* (2013.01)

(58) Field of Classification Search
USPC .................................................. 358/1.1–1.18
See application file for complete search history.

(56) References Cited

U.S. PATENT DOCUMENTS

2013/0194483 A1   8/2013   Takashima et al.

FOREIGN PATENT DOCUMENTS

| CN | 1913591 A    | 2/2007  |
| CN | 101157520 A  | 4/2008  |
| JP | S56-092138 A | 7/1981  |
| JP | H11-109269 A | 4/1999  |
| JP | 2000-094567 A | 4/2000 |
| JP | 2008-066679 A | 3/2008  |
| JP | 2009-014760 A | 1/2009  |
| JP | 2009-294532 A | 12/2009 |

*Primary Examiner* — Douglas Tran
(74) *Attorney, Agent, or Firm* — Canon USA, Inc. IP Division

(57) ABSTRACT

An imaging apparatus for imaging a subject image from a lens on an imaging element through an optical filter has a porous body having pores which three dimensionally communicate with each other at least at a side opposite to the imaging element of the optical filter.

26 Claims, 12 Drawing Sheets

IMAGING APPARATUS AND IMAGE FORMING APPARATUS HAVING CONTINUOUS PORES IN THREE DIMENSIONS IN POROUS BODY

CROSS-REFERENCE TO RELATED APPLICATION

This application is a Continuation of U.S. application Ser. No. 13/532,288, filed Jun. 25, 2012, which claims priority from Japanese Patent Application No. 2011-146512 filed Jun. 30, 2011 and No. 2012-126379 filed Jun. 1, 2012, which are hereby incorporated by reference herein in their entirety.

BACKGROUND OF THE INVENTION

1. Field of the Invention

One disclosed aspect of the embodiments relates to an imaging apparatus and an image forming apparatus employing a porous body for suppressing adhesion of foreign substances, such as dust.

2. Description of the Related Art

In imaging apparatuses, such as a digital camera etc, a photographing luminous flux is received by an imaging element, such as a CCD or a C-MOS, and then a photoelectric conversion signal output from the imaging element is converted to image data to be recorded in a recording medium, such as a memory card.

In such an imaging apparatus, a low pass filter or an infrared ray cut filter is disposed at the side of a subject of the imaging element. Particularly in a digital single-lens reflex camera in which the lens may be exchanged, a mechanical operation portion, such as a shutter, is disposed near an optical filter, such as a low pass filter, and foreign substances, such as dust generated from the operation portions, sometimes adhere to the low pass filter or the like. Moreover, dust or the like enters the camera main body from an aperture of a lens mount, and sometimes adhere to the low pass filter or the like during exchanging the lens. When dust adheres to the optical filter, such as a low pass filter, the adhesion point appears in a captured image as a black (gray) point, which sometimes reduces the quality of the captured image.

As a former technique for solving the problems, Japanese Patent Laid-Open No. 2002-204379 discloses a technique in which a dustproof film is provided at the side of a subject of an imaging element, and the dustproof film is vibrated by a piezoelectric element to remove dust. Moreover, Japanese Patent Laid-Open No. 2006-163275 discloses a technique in which the surface is coated in such a manner that dust or the like is hard to adhere.

In image forming apparatuses, such as an electrophotographic copying machine and an electrophotographic printer, a photoconductor is irradiated with laser light to form an electrostatic latent image. Then, the electrostatic latent image is developed with a toner, the toner image to be obtained is transferred onto a sheet-like recording medium, and thereafter the toner is heated and fixed with a fixing apparatus to thereby form an image on the recording medium.

Such an image forming apparatus has, in a housing, a light source which emits laser light based on image information, a rotary polygon mirror for deflecting and scanning the laser light emitted from the light source, an Fθ lens by which the laser light deflected and scanned by the rotary polygon mirror is imaged on a photoreceptor, a reflecting mirror, and the like. The image forming apparatus further has an optical apparatus which irradiates a photoconductor with laser light from an aperture in the housing. When there is dirt on a laser optical path, image omission arises at a portion corresponding to the dirt on the image, which sometimes reduces the image quality. Therefore, an apparatus has been proposed in which the entrance of dust, a toner, or the like is prevented by sealing the housing, and a transparent dustproof glass is attached to the aperture of the housing which emits laser light and a shutter is provided thereto, whereby dirt of the dustproof glass is prevented (Japanese Patent Laid-Open No. 11-167080).

Japanese Patent Laid-Open No. 2002-204379 mentioned above discloses a method for vibrating a dustproof film to thereby remove foreign substances, in which, in order to remove the foreign substance adhering to the dustproof film, high energy is required and also the structure becomes complicated.

The method in which the surface is coated in such a manner that dust or the like becomes difficult to adhere to the surface described in Japanese Patent Laid-Open No. 2006-163275 requires the formation of a plurality of optical films as an antireflection film for maintaining the optical performance.

According to the method in which the shutter is provided described in Japanese Patent Laid-Open No. 11-167080, the apparatus is easily damaged and also the structure becomes complicated.

Moreover, dust removal may not be satisfactorily achieved by the former techniques, and a further dust reduction has been required.

SUMMARY OF THE INVENTION

One disclosed aspect of the embodiments provides an imaging apparatus and an image forming apparatus employing a porous body having high strength, low reflection, and excellent dust proof property.

In order to solve the above-described problems, the imaging apparatus is an imaging apparatus for imaging a subject image from a lens on an imaging element through an optical filter and has a porous body having pores which three dimensionally communicate with each other at least at a side opposite to the imaging element of the optical filter.

The image forming apparatus is an image forming apparatus having an optical apparatus for forming an image by emitting light, in which a least one portion of a dustproof glass provided in the optical apparatus is a porous body having pores which three dimensionally communicate with each other.

One embodiment may provide an imaging apparatus and an image forming apparatus employing a porous body having high strength, low reflection, and excellent dust proof property.

Further features of the disclosure will become apparent from the following description of exemplary embodiments with reference to the attached drawings.

DESCRIPTION OF THE EMBODIMENTS

Hereinafter, suitable embodiments are described in detail with reference to the attached drawings. However, the embodiments do not limit the scope of the disclosure.

First Embodiment

Figure 1:
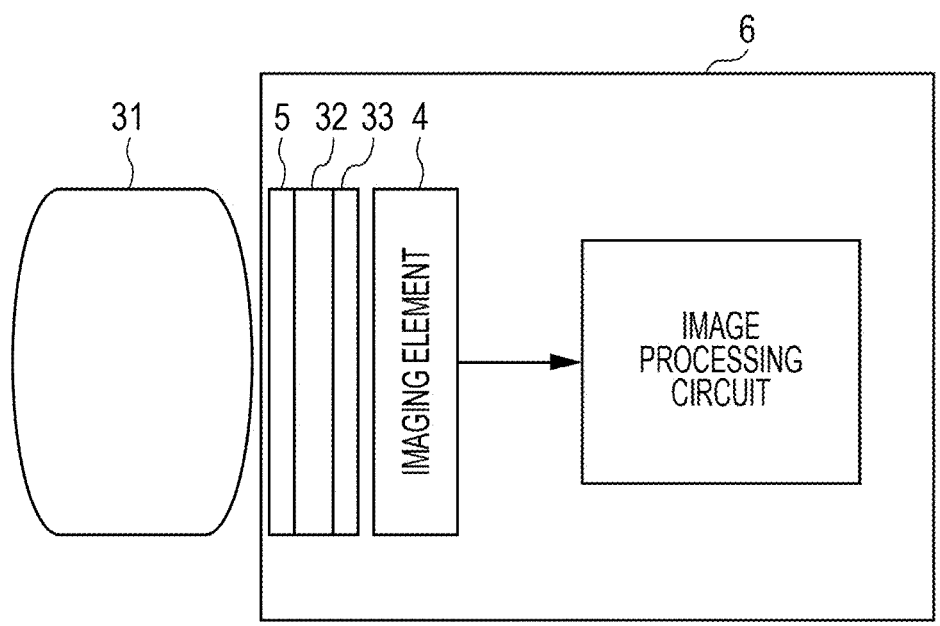
FIG. 1 is a view explaining an imaging apparatus according to one embodiment.

As a first embodiment, an imaging apparatus employing a porous body, specifically an imaging apparatus for imaging a subject image from a lens on an imaging element through an optical filter, is described. FIG. 1 is a view illustrating one embodiment of the imaging apparatus. FIG. 1 includes an imaging apparatus 6 and a lens 31 which is detachably attached to the imaging apparatus 6. In imaging apparatuses, such as a digital single lens reflex camera, photographing image screens of various field angles may be obtained by changing photographic lenses for use in photographing to lenses different in the focal lengths. The reference numeral 4 denotes an imaging element. The reference numeral 5 is a porous body, the reference numeral 32 denotes a low pass filter, and the reference numeral 33 denotes an infrared ray cut filter. The imaging element 4 is housed in a package (not illustrated), and the package holds the imaging element in the sealing state with a cover glass (not illustrated). In the optical path ranging from an imaging optical system in the removal lens 31 to the imaging element 6, the low pass filter 32 is provided which limits the cut-off frequency of the imaging optical system in such a manner that spatial frequency components which are higher than necessary of an object image are not transmitted onto the imaging element 4. Moreover, the infrared cut filter 33 is also formed. The space between the optical filter, such as the low pass filter or the infrared cut filter, and the cover glass (not illustrated) forms a sealed structure (not illustrated) with a sealing member, such as a double-stick tape. Thus, it is configured such that dust generated outside the imaging apparatus or in the imaging apparatus does not enter the space between these optical filters and the cover glass. This embodiment describes an example having both the low pass filter and the infrared cut filter as the optical filter but either one of the low pass filter or the infrared cut filter may be provided. The porous body may be integrally formed as a film on a base material. The base material may be a crystal in the low pass filter 32 or may be a heat-resistant glass, such as quartz glass, 7059 glass of Corning, Inc., or Neoceram N-0 of Nippon Electric Glass Co., Ltd. The heat-resistant glass refers to a base material which may bear a process for forming the porous body, and may be subjected to matching of the thermal expansion with the porous body and the adjustment of the film thickness. The porous body 5 is disposed at least at the side opposite to the imaging element 4 of the optical filter. In other words, the porous body 5 is disposed at a side near the removable lens 31 of the optical filter. More specifically, the porous body 5 is disposed at the environment of the vicinity of the attachment portion of the removable lens. In the vicinity of the environment, a mechanical operation portion, such as a shutter, is disposed, so that foreign substances, such as dust, generated from the operation portions, sometimes adhere to the low pass filter and the like. Moreover, when exchanging the lens, dust or the like sometimes enters the camera main body from an aperture of a lens mount, and adhere thereto. Thus, dust, dirt, and the like easily enter, so that the apparatus is likely to contact foreign substances to be easily damaged. It is a matter of course that the porous body may be disposed at any place of the imaging apparatus where dust is easily attached. Moreover, a foreign substance removal apparatus for applying vibration or the like to the porous body to thereby remove the foreign substances may also be provided.

Figure 2:
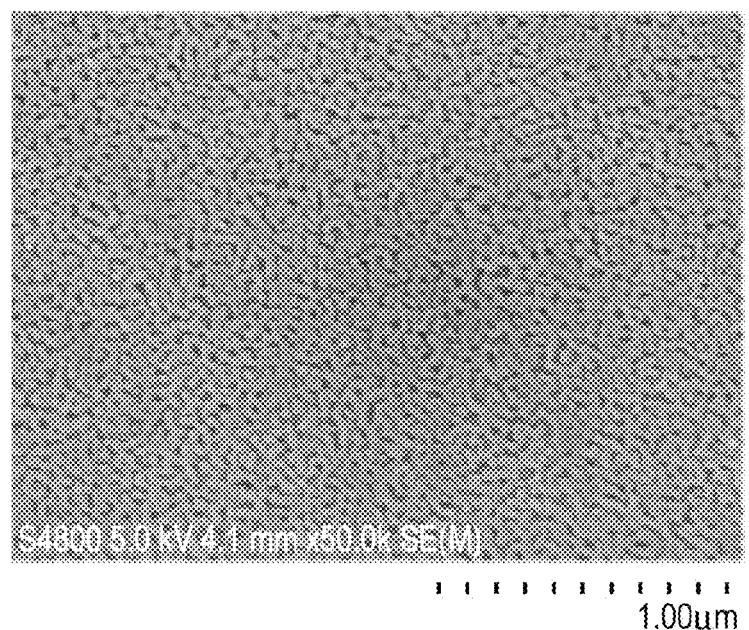
FIG. 2 includes electron microscope observation views explaining a porous body according to one embodiment.
Figure 2:
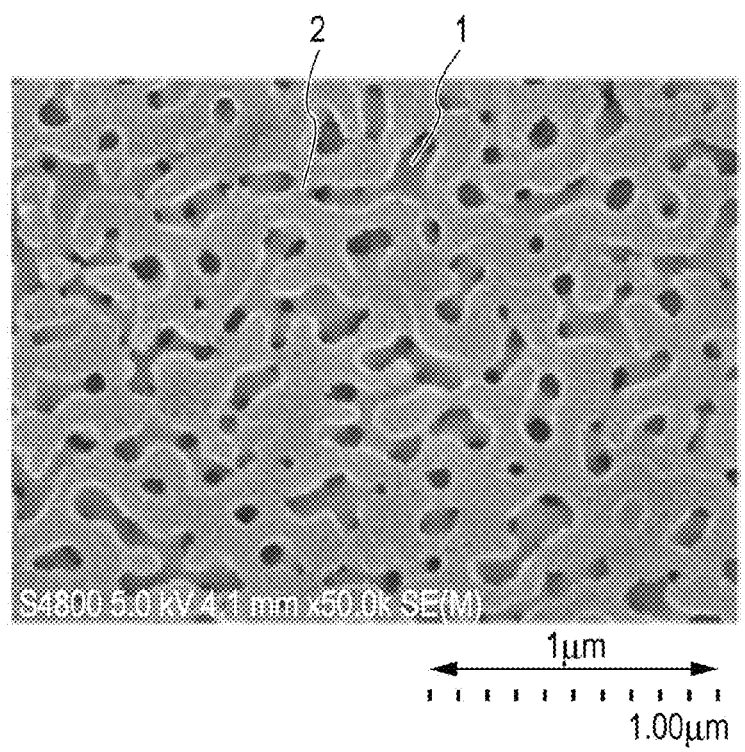

Next, the porous body is described. FIG. 2 includes electron microscope observation views of the porous body surface. In FIG. 2, the reference numeral 1 denotes pores, in which continuous pores are formed while bending in the horizontal direction of the sheet toward the inside of glass (perpendicular direction of the sheet). The reference numeral 2 denotes the skeleton forming the pores and contains silicon oxide, for example. FIG. 2 includes electron microscope observation views of the porous body surface, in which the same pores and the skeleton are formed also in the glass. In this description, the pores which communicate with each other while bending in the horizontal direction of the sheet toward the inside of the glass (perpendicular direction of the sheet) as illustrated in FIG. 2 are referred to as the pores which three dimensionally communicate with each other. The skeleton 2, i.e., the structure in which the skeleton is continuous while three dimensionally (perpendicular direction and horizontal direction of the sheet) complicatedly bending as illustrated in FIG. 2 is referred to as a spinodal structure. The spinodal structure means a porous structure derived from spinodal type phase separation. The porous body forms the pores which three dimensionally communicate with each other by the skeleton which is continuous while three dimensionally complicatedly bending. In other words, the porous body has three dimensionally continuous network pores. The porous body having such a characteristic shape is obtained by, for example, removing one phase of a phase separated glass which is phase separated into two phases.

In the porous body having network pores which three dimensionally communicate with each other, since the skeleton (portion other than the pores) is densely present not only in the film thickness direction but in the direction perpendicular to the film thickness direction, sufficient strength is obtained. For example, although the case where human beings (or machines) directly touch foreign substances adhering to the porous body and remove the same may be considered, strength is sufficiently high so that the surface structure is not destroyed even when the foreign substances are removed using cleaning members, such as rubber or fiber.

Figure 3:
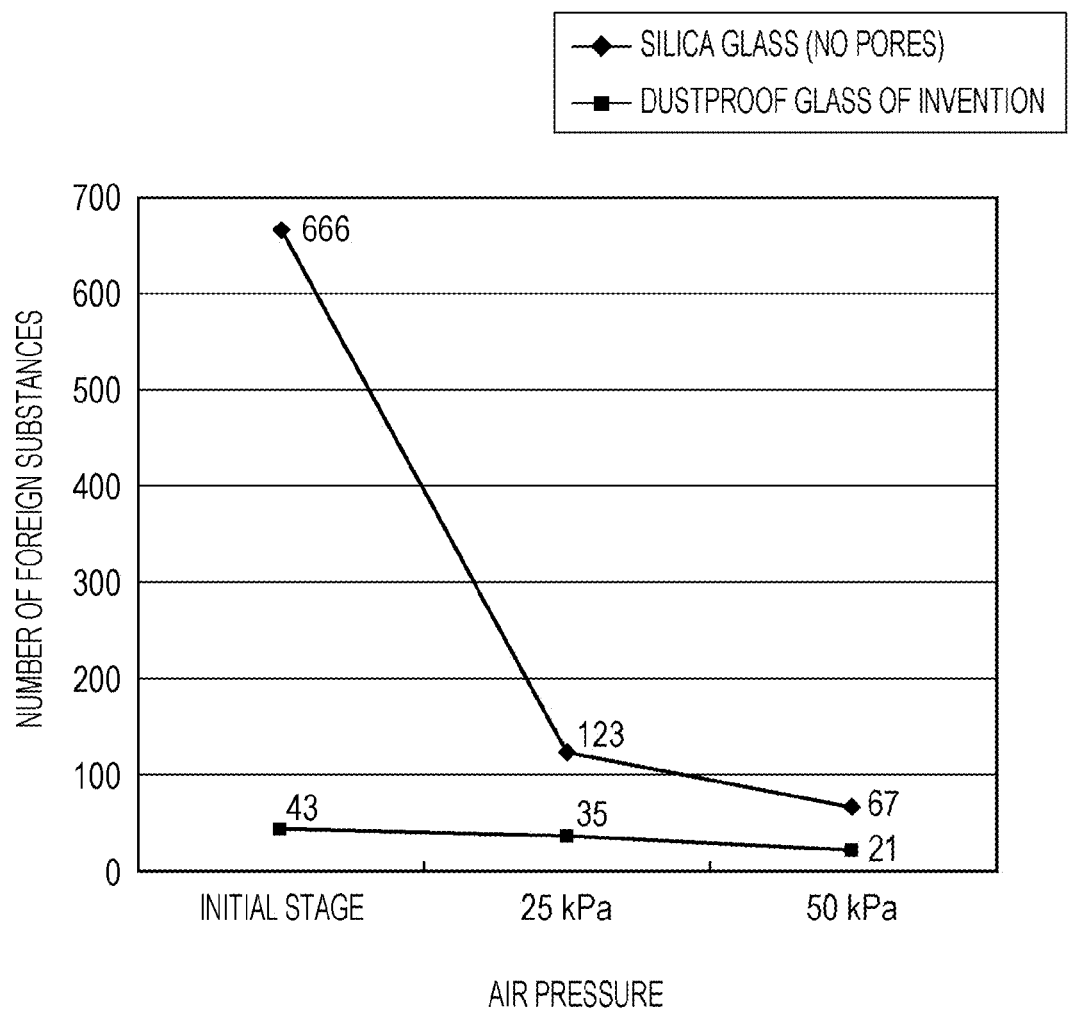
FIG. 3 is a graph showing a dustproof effect.

FIG. 3 is a view obtained by measuring the number of foreign substances adhering to the surface after applying 25 KPa air pressure and 50 KPa air pressure to silica glass having no pores in the surface and the porous body before measurement (initial stage), and graphing the number of the foreign substances. It is found that foreign substances hardly adheres to the porous body from the initial stage (before applying air pressure) as compared with the silica glass having no pores in the surface. Some reasons why the porous body has an excellent dustproof effect are considered. In the silica glass having no pores in the surface, the power of sucking dust, dirt, and the like generates on the entire glass surface. However, in the porous body, the sucking power generates only on the skeleton portions of the porous body. Therefore, it is considered that the sucking power may be weakened. Moreover, the pores of the porous body are three dimensionally entangled toward the inside and communicate with each other, and thus is excellent in breathability. It is considered that this also plays a role of preventing the adsorption of dust, dirt, and the like to the surface. Moreover, the porous body demonstrates an excellent dustproof effect due to lowered liquid crosslinking as shown thereafter.

Figure 4A:
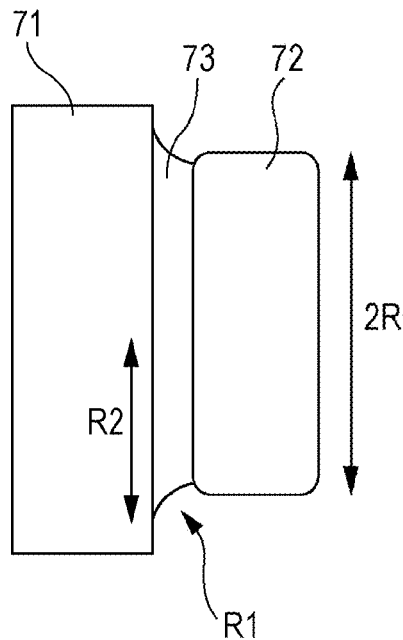
FIGS. 4A and 4B are views explaining liquid crosslinking.
Figure 4B:
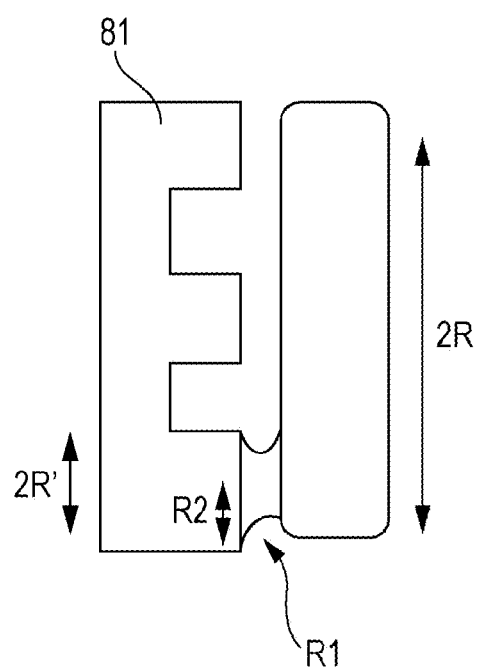

FIGS. 4A and 4B schematically illustrate the adsorbability obtained by liquid crosslinking. When a liquid 73 is present between an object 71 and a dust 72, liquid crosslinking is formed between the object 71 and the dust 72, so that the pressure of the inside of the air interface of the liquid crosslinking and the pressure of the outside thereof are different from each other, and the pressure at the liquid side is low. When the pressure at the air side is equal to the atmospheric pressure, the pressure at the liquid side becomes a negative pressure in which the pressure is lower than the atmospheric pressure. It is known that the negative pressure is represented by Equation (1). It is also known that the sucking power is represented by Equation (2), and is a value obtained by multiplying the negative pressure p by the area S, which can be related to total area S0 and contact fraction α.

In the equation, R1 is the radius of curvature of the air interface of the liquid 73 formed between the object 71 and the dust 72 and R2 is the radius of the contact region of the object 71 and the liquid 73.

Negative pressure
$$p = \sigma\left(\frac{1}{R1} - \frac{1}{R2}\right) \quad (1)$$

Sucking power
$$F = pS = pS0(1-\alpha) \quad (2)$$

FIG. 4A illustrates the case where the surface of the object 71 is smooth, in which R2 is the radius R of dust. FIG. 4B illustrates the case where an object 81 is a porous body, in which R2 is the half of the skeleton diameter R' of the porous body.

In order to reduce the sucking power, the value of R2 may be brought close to the value of R1, i.e., the contact surface of the object 71 (or 81) and the liquid 73 may be reduced. In FIG. 4B, R1 is determined based on the irregularities of the contact portion and the capillary condensation on the surface but is considered to be close to about 10 nm. While, in the porous body, the value of R2 is not determined by the dust size 2R, but by the skeleton diameter 2R' of the porous body. Since the skeleton diameter 2R' is smaller than the dust size 2R, the sucking power may be much more reduced. Moreover, the sucking power may be further reduced also by increasing the porosity or a.

Figure 5A:
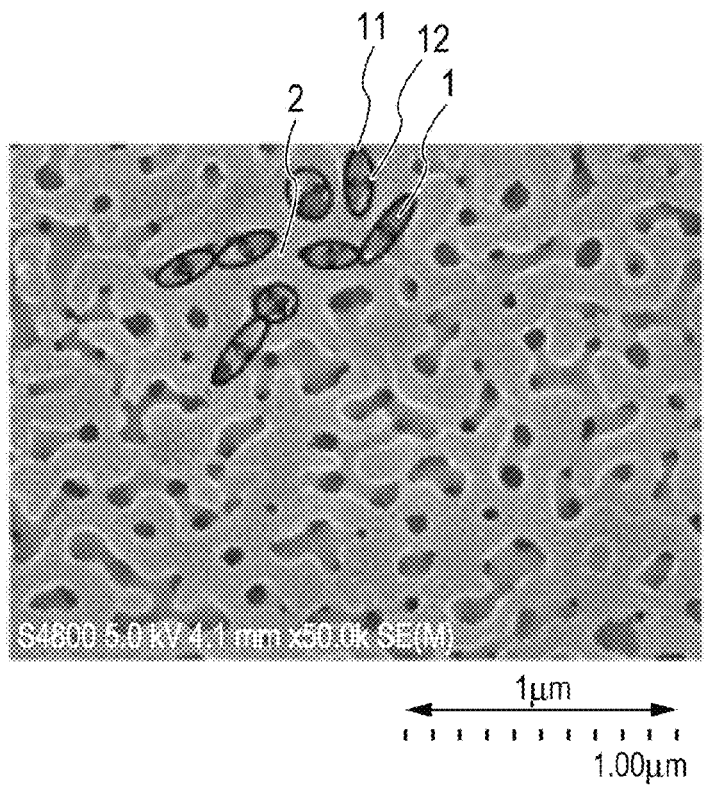
FIGS. 5A and 5B are views explaining the pore diameter and the skeleton diameter.
Figure 5B:
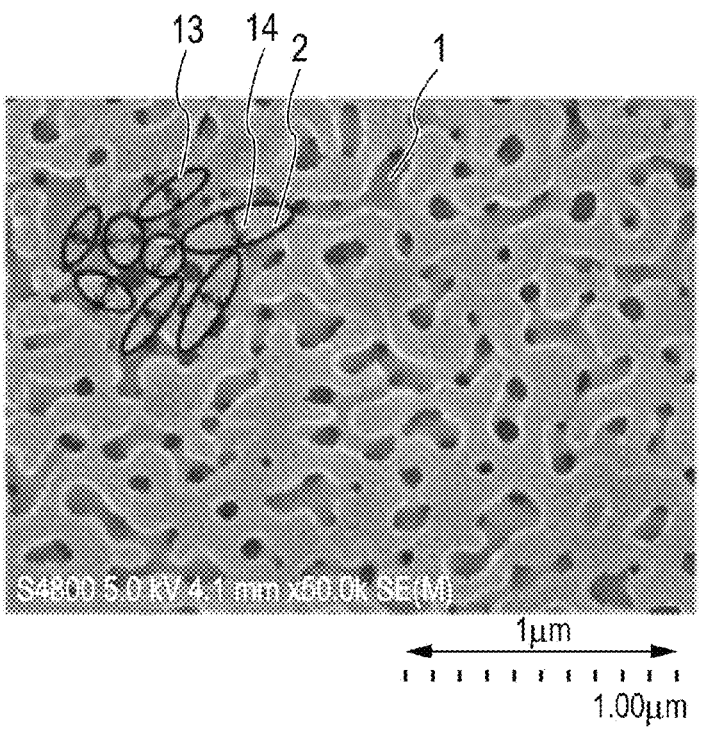

As described above, in order for the porous body to maintain the strength and to obtain a dustproof effect, it is desirable that the average skeleton diameter of the porous body surface is 5 nm or more 80 nm or lower. More suitably, it is desirable that the average skeleton diameter is 5 nm or more and 50 nm or lower. The average skeleton diameter is defined as the average value of the minor axis in a plurality of ellipses by which the skeleton of the porous body surface is approximated. Specifically, as illustrated in, for example, FIG. 5B, the value is obtained by approximating the skeleton 2 by a plurality of ellipses 13 with reference to the electronograph of the porous body surface, and then calculating the average value of the minor axis 14 in each ellipse. At least 30 or more points are measured, and the average value thereof is determined. The measurement is not performed for the entire porous body and may be performed in desired regions. When the average skeleton diameter is smaller than 5 nm, the formation becomes difficult and when the average skeleton diameter is larger than 80 nm, the dustproof effect tends to decrease. When the average skeleton diameter is 50 nm or lower, a higher dustproof effect is demonstrated.

It is desirable that the average pore diameter of the porous body surface is 5 nm or more and 500 nm or lower, particularly 10 nm or more and 100 nm or lower, and further 15 nm or more and 80 nm or lower. The average pore diameter is defined as the average value of the minor axis in a plurality of ellipses by which the pores of the porous body surface are approximated. Specifically, as illustrated in, for example, FIG. 5A, the value is obtained by approximating the pores 1 by a plurality of ellipses 11 with reference to the electronograph of the porous body surface, and then calculating the average value of the minor axis 12 in each ellipse. At least 30 or more points are measured, and the average value thereof is determined.

Furthermore, when considering the mechanical properties, it is desirable that the porosity of the porous body is usually 10% or more and 80% or lower and particularly 20% or more and 75% or lower. The porosity in this description is defined as the proportion of the pores when the area of the porous body surface is set to 1. Specifically, treatment for performing binarization with the skeleton portions and the pore portions with reference to the electronograph of the porous body surface containing the porous body as illustrated in FIG. 1, and determining the same from the ratio. When the porosity is 80% or lower, the mechanical properties may be demonstrated and a dustproof function is also demonstrated.

When an antireflection function is required, the reflection on the interface with the air is reduced when the porosity is increased. In this case, the porosity is suitably 30% or more and more suitably 50% or more. Since the porous body has skeleton which is continuous while three dimensionally complicatedly bending, the strength does not decrease even when the porosity is increased. Therefore, the refractive index may be lowered while maintaining the strength. Thus, the porous body may be provided which has excellent antireflection performance and also has strength with which the surface is not damaged even when touching the surface.

The shape of the porous body is not particularly limited and, for example, a plate like porous body, a porous body having a curved surface, and an aspect in which a porous body is formed on a base material are mentioned. These shapes may be selected as appropriate. Usable for the base material are base materials having heat resistance, such as quartz glass, 7059 glass of Corning, Inc., Neoceram N-0 of Nippon Electric Glass Co., Ltd., sapphire, crystal, and the like. An aspect may also be suitably used in which the porous body is directly formed on a crystal used in a low pass filter. Since excellent antireflection performance is imparted, it is not necessary to separately provide an antireflection film, and an optical member having optical performance with an excellent antireflection effect and an excellent dustproof effect on the surface may be obtained.

Figure 6:
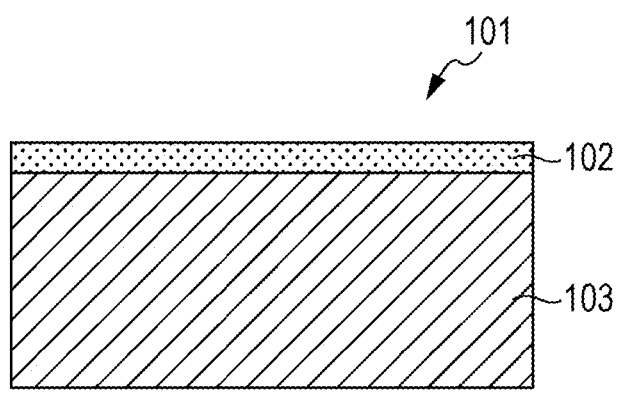
FIG. 6 is a view explaining an optical member according to one embodiment.

Next, with respect to the aspect in which a porous body is integrally formed on a base material, the outline structure thereof is described as follows. This aspect is referred to as an optical member in this description. In FIG. 6, an optical member 101 has a porous body 102 having the pores which three dimensionally communicate with each other as described in the first embodiment on a base material 103. However, an optical member containing only the porous body 102 is not excluded.

Since the optical member 101 has the porous body 102 having the pores which three dimensionally communicate with each other on the surface, the optical member 101 has surface properties having both high surface strength and high porosity and also has high dustproof performance. The optical member 101 may achieve higher strength by the use of the base material 103. Furthermore, since the porous body is formed on the base material, the thickness of the porous body may be controlled. As required, the porosity of the pores continuously or intermittently may vary entirely or partially in the porous body.

In the optical member, the boundary of the porous body and the base material is clear. Therefore, when used as an optical member, a variance of each sample decreases, so that high design accuracy may be realized. Although the details are described later, a porous body having pores according to the purpose may be formed by arbitrarily changing the heat treatment conditions during manufacturing (heat treatment conditions for causing phase separation).

The optical member has the skeleton of the spinodal structure, in which the porous body surface and the base material are continuously connected through the continuous pores. Therefore, various application and development may be achieved in which the features of the base material and the spinodal structure are utilized by the use of arbitrary pore diameters and arbitrary base materials.

The thickness of the porous body is not particularly limited and is suitably 0.05 μm or more and 200.00 μm or lower and more suitably 0.10 μm or more and 50.00 μm or lower. When the thickness is smaller than 0.05 μm, there is a tendency that the formation of the spinodal structure becomes difficult and when the thickness is larger than 200.00 μm, there is a possibility that the manufacturing cost for the formation of the porous body becomes high.

As the shape of the base material, base materials having any shape may be used insofar as the porous body may be formed. As the shape of the base material, a base material having a curvature may be acceptable.

The softening temperature of the base material is suitably equal to or higher than the heating temperature for phase separation for forming the spinodal structure of the porous body described later and is more suitably equal to or higher than a temperature obtained by adding 100° C. to the heating temperature for phase separation. However, when the base material is a crystal, the melting temperature is the softening temperature. When the softening temperature is lower than the temperature for forming the spinodal structure of the porous body, the base material deforms during a heat treatment process for phase separation, and therefore the temperature is not suitable. The heating temperature for phase separation for forming the spinodal structure represents the maximum temperature among temperatures for forming the porous body (porous glass layer) of the spinodal structure.

It is suitable that the base material has resistance to etching of a glass layer.

In the optical member, the refractive index may be arbitrarily changed by controlling the porosity, and further the thickness of the porous body (porous glass layer) may be arbitrarily changed.

Figure 7A:
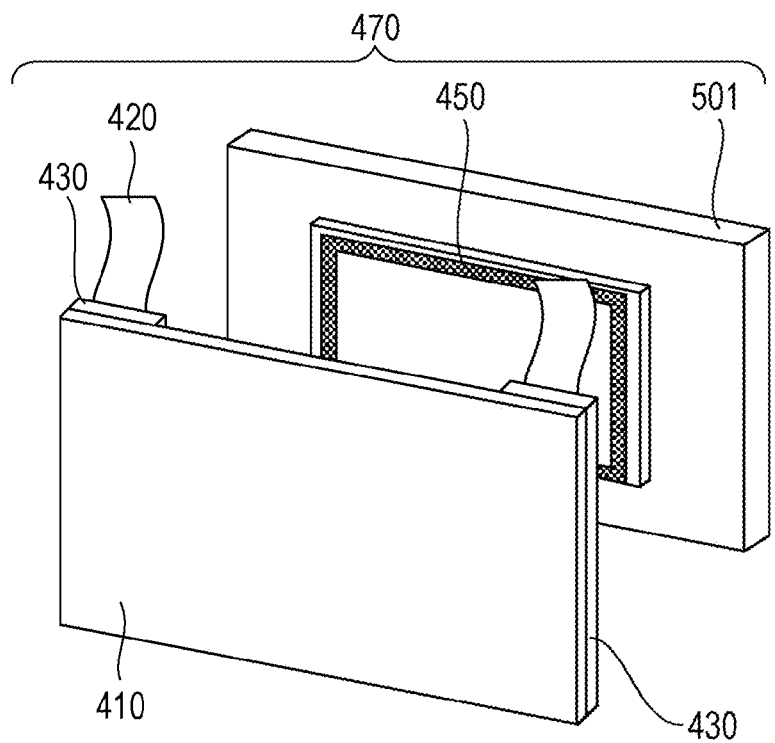
FIGS. 7A and 7B illustrate an example of a foreign substance removal apparatus provided in the imaging apparatus according to one embodiment.
Figure 7B:
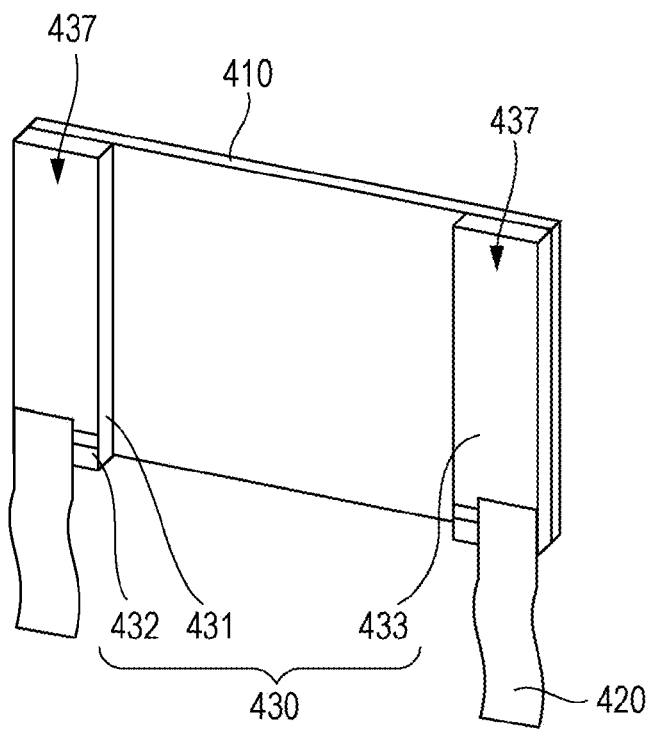

The imaging apparatus may have a foreign substance removal apparatus as described above. FIGS. 7A and 7B are schematic views illustrating an example of a foreign substance removal apparatus 470. The foreign substance removal apparatus 470 is constituted by a vibration member 410, a flexible printed circuit board 420 connected to a piezoelectric element 430, and a fixation member referred to as sealing member 450, and is attached to a support 501 having an imaging element and the like. The piezoelectric element 430 and the vibration member 410 are fixed to the plate surface of the vibration member 410 with a first electrode surface of the piezoelectric element 430 as illustrated in FIG. 7B. The flexible printed circuit board 420 is electrically connected to a portion of a second electrode surface 437 of the piezoelectric element 430, so that an alternating voltage may be applied to the piezoelectric element 430 from the power supply. Although the details are described later, the vibration member 410 is vibrated by the application of the alternating voltage. When the foreign substance removal apparatus 470 is provided in contact with the porous body, foreign substances, such as dust and dirt, are hard to adhere to the porous body and further the foreign substances may be efficiently removed therefrom by applying vibration or the like by the foreign substance removal apparatus.

Figure 8:
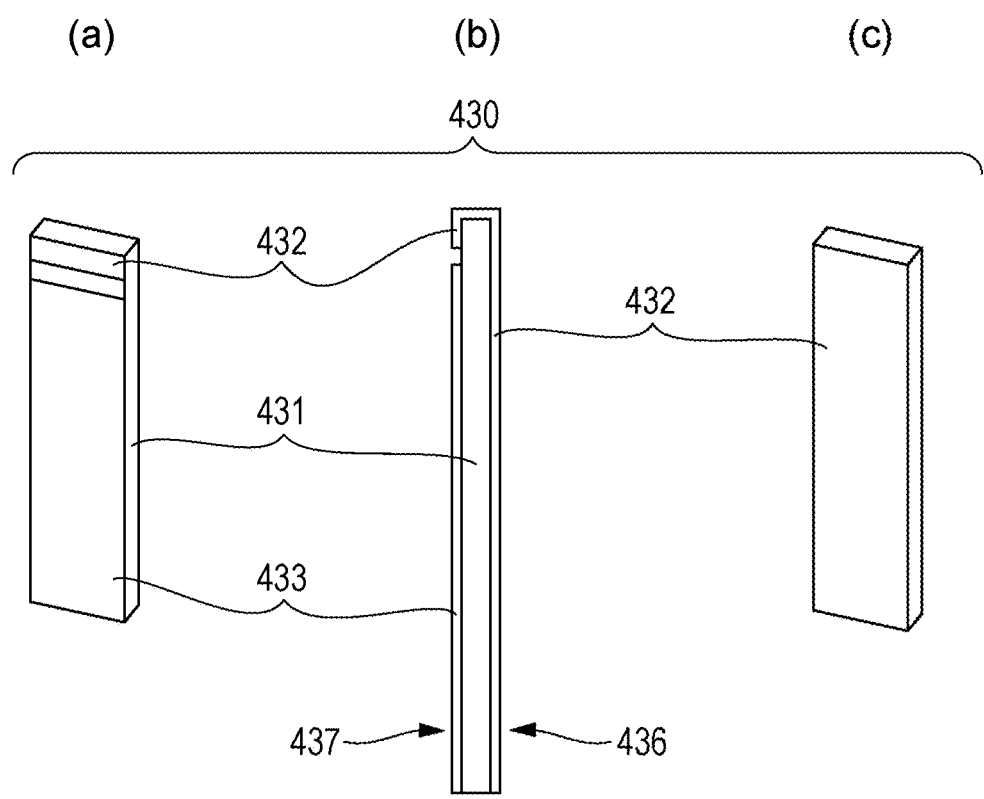
FIG. 8 is a view illustrating an example of a piezoelectric element.

FIG. 8 is a view illustrating an example of the piezoelectric element 430 provided in the foreign substance removal apparatus. The piezoelectric element 430 is constituted by a piezoelectric material 431, a first electrode 432, and a second electrode 433, in which the first electrode 432 and the second electrode 433 are disposed facing each other to the plate surface of the piezoelectric material 431. The surface where a first electrode 432 is disposed at the front of the piezoelectric element 430 of (c) at the right side in FIG. 8 is the first electrode surface 436 and the surface where the second electrode 432 is disposed at the front of the piezoelectric element 430 of (a) at the left side in FIG. 8 is the second electrode surface 437. Herein, the electrode surface refers to the surface of the piezoelectric element where the electrode is placed. For example, as illustrated in FIG. 8, the first electrode 432 may turn around the second electrode surface 437. Furthermore, a third electrode and the like to be utilized for sensing or the like may be provided on the second electrode surface.

The first electrode 432 and the second electrode 433 contain a conductive layer having a thickness of about 5 nm to about 5000 nm. The materials thereof are not particularly limited, and materials usually used for the piezoelectric element may be acceptable. For example, metals, such as Ti, Pt, Ta, Ir, Sr, In, Sn, Au, Al, Fe, Cr, Ni, Pd, Ag, and Cu, and compounds thereof may be mentioned. The first electrode 432 and the second electrode 433 may be one containing one of them or one in which two or more kinds thereof are laminated. The first electrode 432 and the second electrode 433 may contain different materials.

Figure 9:
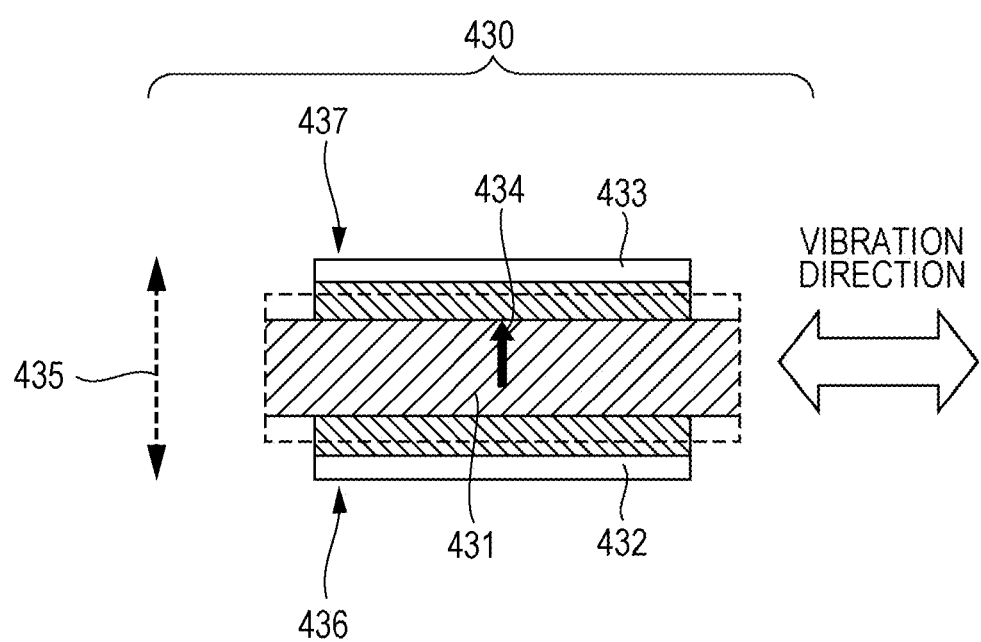
FIG. 9 is a view illustrating an example of the vibration principle of the piezoelectric element according to one embodiment.

FIG. 9 is a view illustrating an example of the operation principle of the piezoelectric element 430 provided in the foreign substance removal apparatus. In the piezoelectric element 430, the piezoelectric material 431 is polarized beforehand in the perpendicular direction of the first electrode surface 436, so that a high frequency voltage may be applied to the first electrode 432 and the second electrode 433 from the power supply. The piezoelectric element 430 causes stretching vibration in the length direction of the piezoelectric element 430 by elastic distortion of the piezoelectric material 431 caused by an alternating electric field generated in the direction indicated by the arrow of an electric field direction 435. The magnitude of the stretching vibration in the length direction of the piezoelectric element is closely related to the magnitude of the piezoelectric displacement resulting from the piezoelectric transversal effect of piezoelectric ceramics. The reference numeral 434 represents the polarization direction.

Figure 10A:
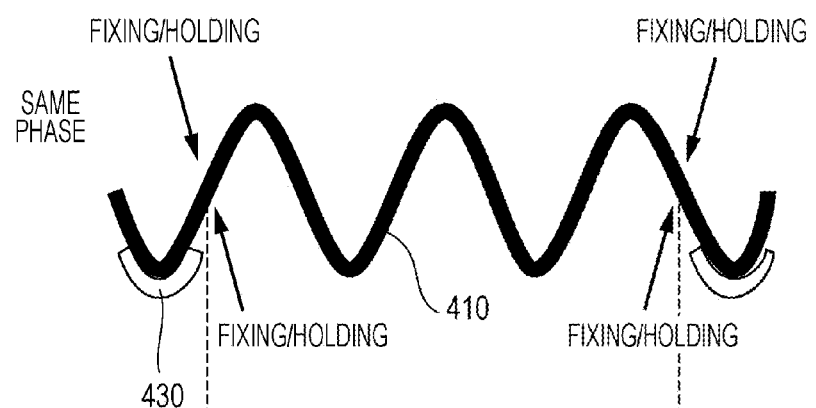
FIGS. 10A and 10B are schematic views illustrating the vibration principle of the foreign substance removal apparatus provided in the imaging apparatus according to one embodiment.
Figure 10B:
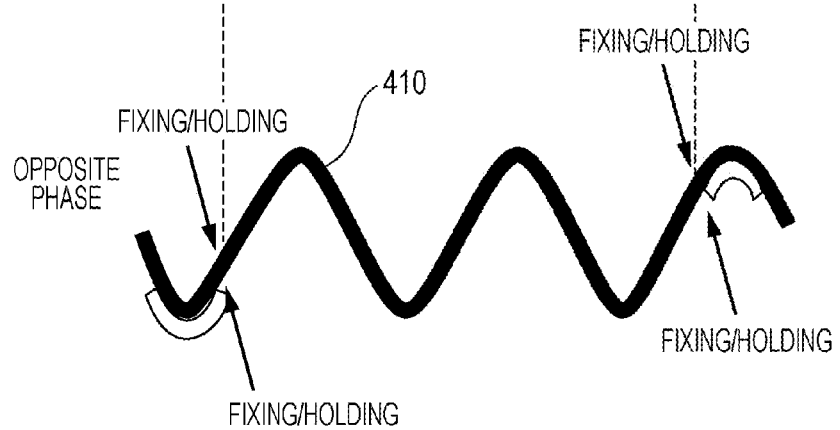

FIGS. 10A and 10B are schematic views illustrating an example of the vibration principle of the foreign substance removal apparatus 470. For convenience, FIGS. 10A and 10B illustrate only the piezoelectric element 430 and the vibration member 410. FIG. 10A illustrates a state where alternating voltages having the same phase are applied to a pair of right and left piezoelectric elements 430 to thereby cause out-of-plane vibration of a standing wave in the vibration member 410. In the pair of right and left piezoelectric elements 430, the polarization direction of the piezoelectric material 431 is the same as the thickness direction of the piezoelectric element 430, and the foreign substance removal apparatus 470 is driven at a seventh-order vibration mode. Herein, the vibration mode refers to a multiple order standing wave having a plurality of nodes or antinodes that may be generated by the out-of-plane vibration of the vibration member or a progressive wave in which nodes or antinodes move in the length direction of the vibration member 410 in a certain time.

FIG. 10B illustrates a state where opposite-phase alternating voltages whose phases are 180° opposite to each other are applied to the one pair of right and left piezoelectric elements 430 through the flexible printed circuit board 420 to cause out-of-plane vibration of a standing wave in the vibration member 410. In the pair of right and left piezoelectric elements 430, the polarization direction of the piezoelectric material 431 is the same as the thickness direction of the piezoelectric element 430, and the foreign substance removal apparatus 470 is driven at a sixth-order vibration mode. Thus, the foreign substance removal apparatus 470 of this embodiment may more efficiently remove dust adhering to the surface of the vibration member 410 by effectively using at least two vibration modes.

However, the foreign substance removal apparatus 470 usable is not always driven at such vibration modes. For example, one piezoelectric element 430 may be provided in the vibration member 410 and, in the one pair of right and left piezoelectric elements 430, the polarization direction of the piezoelectric material 431 does not need to be same as the thickness direction of the piezoelectric elements 430. Furthermore, not the sixth or seventh vibration mode described above but another vibration mode, such as an 18th or 19th vibration mode, may be utilized and three or more kinds of vibration modes may be utilized. FIGS. 10A and 10B illustrate the vibration principle using the vibration mode of a standing wave but a vibration mode using not a standing wave but a progressive wave in which an arbitrary frequency and an arbitrary phase are controlled may be used. It is suitable to select a peculiar mode in which the resonance frequency of the out-of-plane vibration to be generated in the vibration member 410 is outside the audible region in such a manner that the foreign substance removal apparatus 470 does not generate an unpleasant sound.

The foreign substance removal apparatus 470 may be disposed at any place insofar as the foreign substance removal apparatus 470 is placed between the imaging element 4 and the porous body 5 of the imaging apparatus illustrated in FIG. 1. For example, the foreign substance removal apparatus 470 may be provided in such a manner that the vibration member 410 contacts the porous body 5, that the vibration member 410 contacts the low pass filter 32, or that the vibration member 410 contacts the infrared cut filter 33. In particular, when provided contacting the porous body 5, foreign substances may be more efficiently removed as described above. The vibration member 410 of the foreign substance removal apparatus 470 may be integrally formed with the porous body 5 or optical filters, such as the low pass filter 32 or the infrared cut filter 33. The vibration member 410 may also contain the porous body 5 and may have functions of the low pass filter 32, the infrared cut filter 33, and the like.

Second Embodiment

Next, an image forming apparatus employing the porous body described in the first embodiment, specifically an image forming apparatus having an optical apparatus used for emitting light to form an image, is described.

Figure 11:
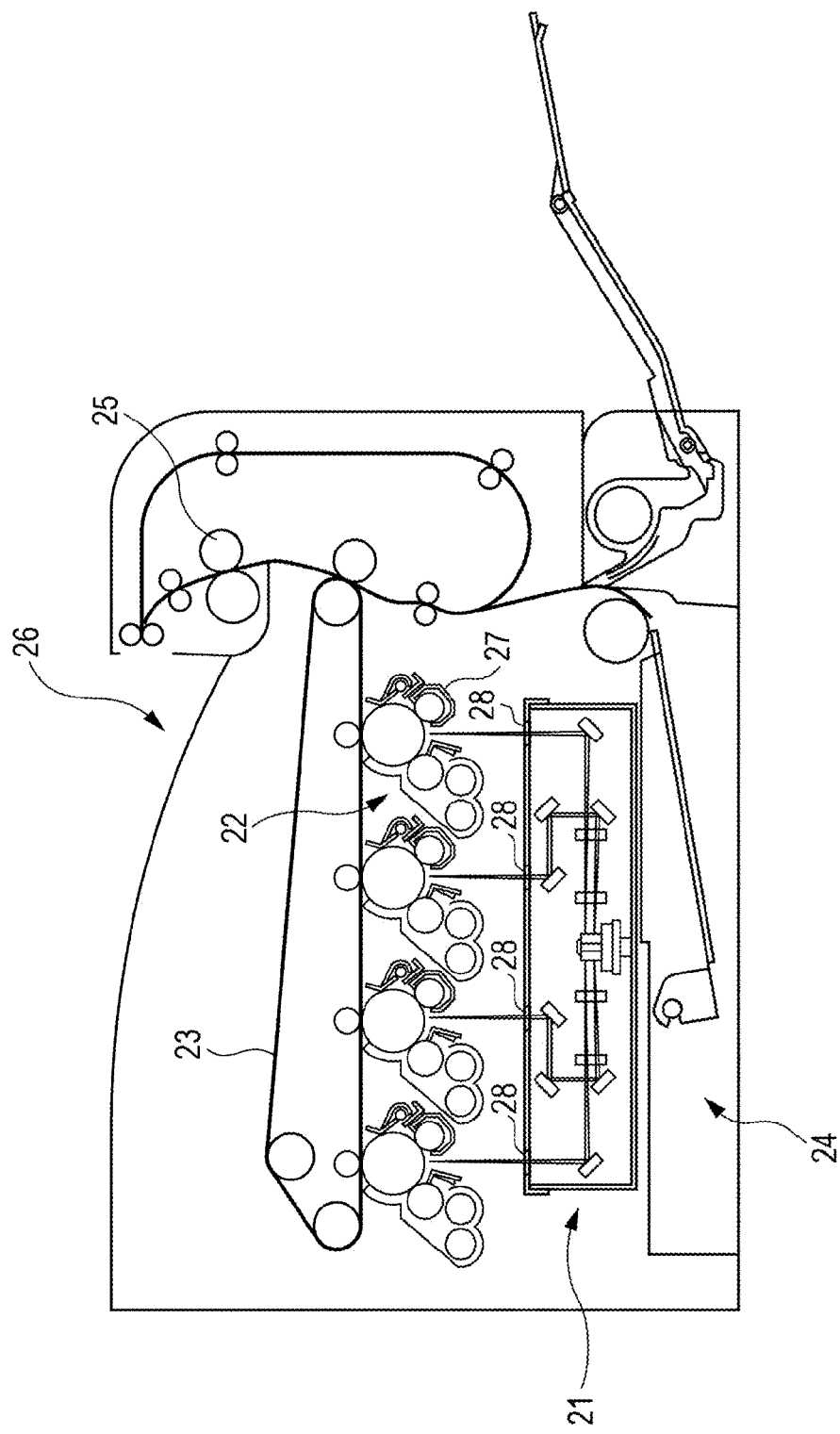
FIG. 11 is a view explaining an image forming apparatus according to one embodiment.

FIG. 11 illustrates an example of the image forming apparatus. FIG. 11 includes an optical apparatus 21 for irradiating a photoconductive drum with laser light based on image information sent from an image scanner, a personal computer, or the like. The reference numeral 22 denotes a development machine which forms a toner image on the photoconductive drum with a toner which has been subjected to frictional electrification. The reference numeral 23 denotes an intermediate transfer belt for conveying the toner image on the photoconductive drum to a transfer paper. The reference numeral 24 denotes a paper feed cassette which stores paper for forming the toner image. The reference numeral 25 denotes a fixing machine which makes the toner image transferred onto the paper adhere to the paper with heat. The reference numeral 26 is a paper discharge tray on which the fixed transfer paper is placed. The reference numeral 27 denotes a cleaner which cleans a toner remaining on the photoconductive drum. The reference numeral 28 denotes a dustproof glass which is disposed at the laser light emitting aperture to the photoconductive drum in such a manner that the toner or dust does not adhere to optical members, such as a mirror or a lens, which are constituent components of the optical apparatus.

In image formation, an image is formed on the photoconductive drum electrified by an electrifier by irradiating the photoconductive drum with laser emission light by the optical apparatus 21 based on image information. Thereafter, by attaching the toner to the image in the development machine 22, a toner image is formed on the photoconductive drum. The toner image is transferred onto the intermediate transfer belt 23 from the photoconductive drum. Then, by transferring the toner image again onto paper conveyed from the paper feed cassette 24, an image is formed on the paper. To the image transferred onto the paper, a toner is fixed by a fixation machine 25, and then placed on the paper discharge tray 26. The optical apparatus 21 has, in housing, a light source which emits laser light based on image information, a rotary polygon mirror for deflecting and scanning the laser light emitted from the light source, and optical members, such as an fθ lens by which the laser light deflected and scanned by the rotary polygon mirror is imaged on a photoreceptor and a reflecting mirror. In order to prevent the adhesion of dirt, such as dust and a toner, to the optical members, such as a mirror or a lens, constituting the optical apparatus, a dustproof glass 28 is provided at the laser light emitting aperture to the photoconductive drum of the housing. When the toner scattering from the development machine or the like is accumulated on the dustproof glass, poor images are formed in which the dropping of the quantity of laser light occurs or white spots are formed. Then, the porous body described in the first embodiment is used for at least one portion of the dustproof glass disposed on the image forming apparatus. The porous body may be integrally formed as a film on the base material. For the base material, base materials having heat resistance, such as quartz glass, 7059 glass of Corning, Inc., Neoceram N-0 of Nippon Electric Glass Co., Ltd., sapphire, crystal, and the like.

In order to suitably use the same for the image forming apparatus, it is desirable that the average skeleton diameter of the porous body surface is 5 nm or more and 80 nm or lower and more suitably the skeleton diameter is 5 nm or more and 50 nm or lower for the same reasons as those of the first embodiment. It is also desirable that the average pore diameter of the porous body surface is 5 nm or more and 500 nm or lower, particularly 10 nm or more and 100 nm or lower, and further 15 nm or more and 80 nm or lower. It is desirable that the porosity of the porous body is usually 10% or more and 80% or lower and particularly 20% or more and 75% or lower.

When an antireflection function is required, the reflection on the interface with the air is reduced when the porosity is increased. In this case, the porosity is suitably 30% or more and more suitably 50% or more.

Although the porous body has an excellent feature that dust, dirt, and the like are hard to adhere thereto, an aspect may be used in which, by attaching a shutter or the like, the dustproof glass is protected from dirt, such as a toner, and dust when the photoconductive drum is not required to be irradiated. A cleaning mechanism for wiping off dirt may also be attached. Since the porous body has high strength, the porous body may bear the shock to the porous body by the shutter, the cleaning mechanism, and the like. The image forming apparatus of this embodiment may further have the foreign substance removal apparatus described above.

Manufacturing Method

Hereinafter, a method for manufacturing the porous body is described. First, a method for manufacturing a member containing only the porous body is described. The porous body is obtained by, for example, removing at least one phase of a phase separated glass which is phase separated into at least two phases.

Mentioned as the materials of a phase separable base glass are, for example, a silicon oxide-boron oxide-alkali metal oxide, a silicon oxide-phosphate-alkali metal oxide, and the like as a silicon oxide base glass. Among the above, it is suitable to use a borosilicate glass of the silicon oxide-boron oxide-alkali metal oxide for the phase separable base glass.

The phase separable base glass may be manufactured by preparing raw materials in such a manner as to have the above-described composition, heating and melting the raw materials containing the supply source of each component, and molding the resultant substance into a desired shape as required. The temperature for heating and melting may be determined as appropriate in accordance with the raw material composition and the like and is usually in the range of 1350° C. to 1450° C. and particularly suitably in the range of 1380° C. to 1430° C. In this description, the heating for melting the raw materials is referred to as heating and melting.

For example, sodium carbonate, boric acid, and silica dioxide may be uniformly mixed as the raw materials, and then the mixture is heated to 1350° C. to 1450° C. for melting. In this case, any raw material may be used as the raw materials insofar as the raw materials contain alkali metal oxide, boron oxide, and silicon oxide components as described above.

When the porous glass is formed into a predetermined shape, a phase separable base glass may be synthesized, and thereafter molded into various shapes, such as a tubular shape, a plate shape, a spherical shape, and the like at a temperature of about 1000° C. to about 1200° C. For example, a method may be suitably employed which includes melting the raw materials mentioned above to synthesize a base glass, lowering the temperature from the melting temperature, and then molding the resultant substance in a state where the temperature is maintained at 1000° C. to 1200° C.

In general, the phase separation of the base glass is carried out by heat-treating the phase separable base glass. The "phase separation" means causing phase separation on the nm of scale of a silicon oxide rich phase and an alkali metal oxide-boron oxide rich phase in the glass when a borosilicate glass of a silicon oxide-boron oxide-alkali metal oxide is used for the base glass, for example. The heating temperature for phase separation for causing the phase separation is 400° C. to 800° C., and the heating time for phase separation may be usually determined in the range of several hours to 100 hours in accordance with the pore diameter or the like of the porous glass to be obtained. In this description, the heating for causing the phase separation of the base glass is referred to as heating for phase separation.

Thus, acid soluble components are eluted and removed by bringing the phase separable glass obtained by the process for heating for phase separation into contact with an acid solution. As the acid solution, inorganic acid, such as hydrochloric acid and nitric acid, may be suitably used, for example, and, in general, the acid solution may be suitably used in an aspect in which water is used as the solvent. The concentration of the acid solution may be determined as appropriate in the range of 0.1 mol/L to 2 mol/L (0.1 to 2 normal). In the acid treatment process for bringing the glass into contact with the acid solution (etching treatment process), the temperature of the acid solution may be set in the range of room temperature to 100° C. and the treatment time may be set to about 1 hour to about 50 hours. Thereafter, the porous body having a skeleton of silicon oxide is obtained through water washing treatment. The temperature of the water for use in the water washing treatment process may be generally set in the range of room temperature to 100° C. The time of the water washing treatment process may be determined as appropriate in accordance with the composition, size, or the like of the target glass and may be generally set to about 1 hour to about 50 hours.

In the heating for phase separation process, a layer of a silicon oxide rich phase which may not be removed by the acid treatment may be formed on the base glass surface. In this case, it is suitable that the layer of a silicon oxide rich phase is removed by polishing or the like, and then the acid treatment is performed. As a polishing measure, mirror finish using $CeO_2$ powder is suitable.

The porous body may be manufactured without passing through the treatment for heating for phase separation or the acid treatment. The method has a process for mixing 4% by weight or more and 20% by weight or lower of sodium oxide, 10% by weight or more and 40% by weight or lower of boron oxide, and 50% by weight or more and 80% by weight or lower of silicon oxide. Next, the method has a process for heating the mixed materials for melting, and then cooling the mixture to obtain a phase separable base glass and a process for bringing the base glass into contact with water without heating the same again to thereby obtain a porous body.

The porous body may be obtained by performing the water washing treatment for bringing the base glass into contact with water. According to the method, the porous body containing a porous body may be obtained only by performing the water washing treatment of the base glass without passing through the treatment for heating for phase separation or the acid treatment by specifying the composition of the base glass in the above-described composition range. As suitable compositions of the mixed materials and the base glass to be used in the manufacturing method, the content of sodium oxide is usually 4% by weight or more and 20% by weight or lower and particularly suitably 4.5% by weight or more and 15% by weight or lower. The content of boron oxide is usually 10% by weight or more and 40% by weight or lower and particularly suitably 12% by weight or more and 35% by weight or lower. The content of silicon oxide is usually 50% by weight or more and 80% by weight or lower and particularly suitably 58% by weight or more and 75% by weight or lower.

By adopting the specific composition, the porous body may be obtained only by the water washing treatment without requiring the treatment for heating for phase separation and the acid treatment. In general, a layer which is hard to etch is formed on the surface of the phase separated glass. After the layer is removed by a mechanical measure, such as polishing, or a chemical measure, such as etching with hydrofluoric acid or an aqueous alkaline solution, etching with an aqueous acid solution is performed. Suitably, the water washing treatment is usually performed using water in a neutral region and immersing in an aqueous solution of a temperature of 50° C. or higher and 100° C. or lower. The water washing treatment may be set to about 1 hour to about 50 hours.

In the sodium oxide-boron oxide-silicon oxide base glass, the total content of sodium oxide, boron oxide, and silicon oxide is 95% by weight or more and 100% by weight or lower based on the total amount of the phase separated glass. The base glass may contain three or more-component oxides in addition to the three-component oxides mentioned above. For example, mentioned as a silicon oxide base glass are silicon oxide-boron oxide-alkali metal oxide-(alkaline earth metal oxide, zinc oxide, aluminum oxide, or zirconium dioxide), a titanium oxide base glass (silicon oxide-boron oxide-calcium oxide-magnesium oxide-aluminum oxide-titanium oxide), a rare earth base glass (boron oxide-alkali metal oxide-(cerium oxide, thorium oxide, hafnium oxide, or lanthanum oxide)), and the like. As a fourth component in addition to the three components or more, aluminum oxide, zirconium oxide, alkaline earth metal oxide, and the like are mentioned, for example, but the fourth component is not limited thereto. The content of the fourth component is lower than 5% by weight.

Even when the sodium oxide-boron oxide-silicon oxide-based phase separated glass in the above-described composition range is subjected to only the water washing treatment without subjected to the heat treatment or the acid treatment, the same porous body as that produced with a general manufacturing method may be obtained.

Next, a method for forming the porous body (porous glass layer) on the base material is described.

In order to form the porous body (porous glass layer) on the base material, the method has a process including forming, on the base material, a glass powder layer containing, as the main components, glass powder containing a basic glass obtained by at least mixing and melting porous glass generation raw materials. The method further has a process for obtaining the phase separated glass layer which is phase separated by heat-treating the glass powder layer at a temperature equal to or higher than the glass transition point of the glass powder and a process for obtaining the porous glass layer of the spinodal structure having continuous pores by etching the phase separated glass layer.

Mentioned as an example of the manufacturing method are all the manufacturing methods which may achieve the formation of a glass layer, such as a printing method, a vacuum deposition method, a sputtering method, a spin coating method, and a dip coating method, and any manufacturing method may be used insofar as the structure of the embodiments may be achieved.

It is preferable to form the spinodal structure in the porous body on the base material. The formation of the spinodal structure requires precise composition control of glass. A film formation method which includes determining the glass composition once, forming glass powder, and then melting the same is excellent in that the composition control may be easily performed.

The phase separated glass layer may be obtained which is phase separated by heating the glass powder layer at a temperature equal to or higher than the glass transition point of the glass powder. At a temperature lower than the glass transition point of the glass powder, the melting of the glass powder does not proceed, so that the layer formation is not performed. In contrast, only by simply heating the glass powder, the phase separation is not performed, so that the porous body (porous glass layer) of the spinodal structure may not be formed in some cases.

The present inventors have conducted extensive research, and as a result, have found that the phenomenon of hindering the formation of the spinodal structure is caused by the crystallization in the heat treatment of the glass powder, for example, and the object of the embodiment is achieved by precisely controlling the heat treatment conditions. More specifically, it is considered that since the phase separation phenomenon of glass occurs in the amorphous state, it is required to select a heat treatment method for forming a layer while maintaining the amorphous state when melting glass powder to form a porous body (glass layer). As the heat treatment method for forming a layer while maintaining the amorphous state, any method may be used insofar as the amorphous state may be maintained. Mentioned as an example is a method for suppressing the formation of the crystal nucleus by performing the heat treatment at a temperature equal to or lower than the crystallization temperature or a method for suppressing the formation of the crystal nucleus by rapidly cooling glass from the melting state at a high temperature (crystallization temperature or higher).

Hereinafter, an embodiment of the process for forming a glass powder layer containing glass powder containing, as the main components, a basic glass obtained mixing and melting raw materials for generating the porous body (porous glass) is described. Specifically, a glass paste containing glass powder containing, as the main components, a basic glass obtained by at least mixing and melting the porous glass generation raw materials and a solvent is applied onto a base material, and then the solvent is removed to thereby form a glass powder layer. Mentioned as an example of a method for forming the glass powder layer are a printing method, a spin coating method, a dip coating method, and the like.

Hereinafter, a method employing a general screen printing method is described as an example of the method for forming the glass powder layer containing glass powder.

According to the screen printing method, glass powder is formed into a paste, and then is printed using a screen printer. Therefore, the preparation of the paste is indispensable.

The porous body (porous glass layer) is formed by the phase separation of glass. Therefore, it is suitable to use a phase separable base glass which may be phase separated as the glass powder for use in the glass paste.

The materials of the phase separable base glass base material which forms the spinodal structure are not particularly limited. For example, mentioned are a silicon oxide glass I (Base glass composition: silicon oxide-boron oxide-alkali metal oxide), a silicon oxide glass II (Base glass composition: silicon oxide-boron oxide-alkali metal oxide-(alkaline earth metal oxide, zinc oxide, aluminum oxide, or zirconium oxide)), a titanium oxide glass (Base glass composition: silicon oxide-boron oxide-calcium oxide-magnesium oxide-aluminum oxide-titanium oxide), and the like. Among the above, a borosilicate glass of silicon oxide-boron oxide-alkali metal oxide is suitable.

In the borosilicate glass, glass having a composition such that the proportion of silicon oxide is 50.0% by weight or more and 80.0% by weight or lower and particularly 55.0% by weight or more and 75.0% by weight or lower is suitable. When the proportion of silicon oxide is in the above-described range, there is a tendency that a phase separated glass with high skeleton strength may be easily obtained. Therefore, the proportion is particularly useful for the case where strength is required.

As the method for manufacturing the phase separable base glass, the phase separable base glass may be manufactured using known methods, besides preparing the raw materials in such a manner as to have the above-described composition. For example, the phase separable base glass may be manufactured by heating and melting the raw materials containing the supply source of each component, and molding the resultant substance into a desired shape as required. The heating temperature for heating and melting may be determined as appropriate in accordance with the raw material composition and the like and is usually in the range of 1300° C. to 1450° C. and particularly suitably in the range of 1320° C. to 1430° C.

For example, sodium oxide, boric acid, and silica dioxide may be uniformly mixed as the raw materials, and then the mixture is heated to 1300° C. to 1450° C. for melting. In this case, any raw material may be used as the raw materials insofar as the raw materials contain alkali metal oxide, boron oxide, and silicon oxide components mentioned above.

When the phase separable base glass is formed into a predetermined shape, the phase separable base glass may be synthesized, and thereafter molded into various shapes, such as a tubular shape, a plate shape, a spherical shape, and the like at a temperature of about 1000° C. to about 1200° C. For example, a method may be suitably employed which includes melting the raw materials mentioned above to synthesize the phase separable base glass, lowering the temperature from the melting temperature, and then molding the glass in a state where the temperature is maintained at 1000° C. to 1200° C.

In the phase separated glass which is likely to be crystallized, it is suitable to use a rapidly cooling measure when lowering the temperature from the melting temperature. By rapidly cooling, the formation of the crystal nucleus in the glass may be suppressed, an amorphous uniform glass layer may be easily formed, and the phase separation may be easily achieved.

In order to use the same as a paste, glass is crushed to obtain glass powder. A crushing method is not required to be particularly limited, and known crushing methods may be used. Mentioned as an example of the crushing method is a crushing method in a liquid phase typified by a bead mill or a crushing method in a vapor phase typified by a jet mill.

In order to form the glass powder layer containing glass powder, the glass powder layer is formed using a paste containing the glass powder. The paste contains a thermoplastic resin, a plasticizer, a solvent, and the like with the above-described glass powder.

It is desirable that the proportion of the glass powder contained in the paste is in the range of 30.0% by weight or more and 90.0% by weight or lower and suitably in the range of 35.0% by weight or more and 70.0% by weight or lower.

The thermoplastic resin contained in the paste is a component which increases the film strength after drying and imparts flexibility. Usable as the thermoplastic resin are polybutyl metacrylate, polyvinyl butyral, polymethyl metacrylate, polyethyl metcrylate, ethyl cellulose, and the like. The thermoplastic resin may be used alone or as a mixture of two or more kinds thereof.

The content of the above-described thermoplastic resin contained in the paste is suitably 0.1% by weight or more and 30.0% by weight or lower. When the content is lower than 0.1% by weight, the film strength after drying tends to become weak. When the content is larger than 30.0% by weight, residual components of the resin are likely to remain in the glass when forming the glass layer. Therefore, the content is not suitable.

Mentioned as the plasticizer contained in the paste are butyl benzyl phthalate, dioctyl phthalate, diisooctyl phthalate, dicapryl phthalate, dibutyl phthalate, and the like. These plasticizers may be used alone or as a mixture of two or more kinds thereof.

The content of the plasticizer contained in the paste is suitably 10.0% by weight or lower. By adding the plasticizer, the drying rate may be controlled and the flexibility may be imparted to a dry film.

Mentioned as the solvent contained in the paste are terpineol, diethylene glycol monobutyl ether acetate, 2,2,4-trimethyl-1,3-pentadiol monoisobutyrate, and the like. The solvents may be used alone or as a mixture of two or more kinds thereof.

The content of the solvent contained in the paste is suitably 10.0% by weight or more and 90.0% by weight or lower. When the content is lower than 10.0% by weight, there is a tendency that a uniform film is difficult to obtain. When the content exceeds 90.0% by weight, there is a tendency that a uniform film is difficult to obtain.

The paste may be produced by kneading the above-described materials at a given ratio.

By applying the paste onto the base material using a screen printing method, and then drying and removing the solvent component of the paste, the glass powder layer containing the glass powder may be formed. In order to achieve the target film thickness, the glass paste may be laminated by applying the same by an arbitrary number of times, and then dried.

The temperature and the time for drying and removing the solvent may be changed as appropriate in accordance with the solvent to be used. It is suitable that a leveling process at a temperature lower than the decomposition temperature of the thermoplastic resin is provided to flatten the surface.

Next, a process for decomposing the resin of the glass powder layer, and then heat-treating the same at a temperature equal to or higher than the glass transition point of the glass powder to thereby obtain a phase separated glass layer which is phase separated.

During the process, the glass powder melt, and phase separation is caused, so that the phase separated glass layer is formed.

In the phase separation, there are binodal type phase separation with discontinuous fine pores and spinodal type phase separation with continuous pores.

Among the above, pores of a porous glass obtained by the spinodal type phase separation structure are three-dimensional network penetration continuous fine pores which are connected from the surface to the inside, and the porosity may be arbitrarily controlled by changing the heat treatment conditions. Since the pores are three-dimensional network penetration continuous pores, high surface strength is imparted.

The decomposition temperature of the thermoplastic resin may be measured using a differential type differential thermal balance (TG-DTA) or the like.

When melting the glass powder, a binder removing process is provided as appropriate in such a manner that a carbon component of the resin does not remain. When melting the glass powder, the glass powder is heat-treated suitably at a temperature equal to or higher than the glass transition point of the glass powder and more suitably in the glass softening temperature region. When the temperature is lower than the glass transition point, the melting of the glass powder does not proceed, and there is a tendency that the glass layer is not formed.

The heat treatment temperature for heat-treating the glass powder is set to 200° C. or higher and 1000° C. or lower, for example. The heat treatment time may be determined as appropriate in accordance with the pore diameter or the like of the porous glass to be obtained in the range of 1 hour to 100 hours. The process for heat-treating the glass powder also includes the phase separation process.

The heat treatment temperature does not need to be a fixed temperature and may be continuously changed or the glass powder may undergo a plurality of different temperature stages.

Next, a process for etching the phase separated glass layer to thereby obtain the porous body (porous glass layer) of the spinodal structure having continuous pores is performed.

The porous glass layer is obtained by removing non-skeleton portions of the phase separated glass layer obtained by the heat treatment process.

As a measure for removing the non-skeleton portions, it is common to elute a soluble phase by bringing the glass into contact with an aqueous solution. As a measure for bringing the glass into contact with the aqueous solution, a measure for immersing the glass in the aqueous solution is common. However, the measure is not limited insofar as the glass and the aqueous solution are brought into contact with each other, such as applying an aqueous solution to the glass.

As the aqueous solution, any existing aqueous solution, such as water, an aqueous acid solution, and an aqueous alkaline solution, may be used insofar as a soluble phase may be eluted.

A plurality of processes for bringing the glass into contact with the aqueous solutions may be selected in accordance with the intended use.

In common etching of the phase separated glass, acid treatment is suitably used from the viewpoint that the load to non-soluble phase portions is low and the viewpoint of the degree of selective etching. By bringing the glass into contact with the aqueous acid solution, an alkali metal oxide-boron oxide rich phase which is an acid soluble component is eluted and removed and, in contrast, high selective etching properties are obtained without deteriorating the stability in the non-soluble phase.

As the aqueous acid solution, inorganic acid, such as hydrochloric acid and nitric acid, is suitable, for example. As the aqueous acid solution, it is suitable to usually use an aqueous solution containing water as the solvent. The concentration of the aqueous acid solution may be usually set as appropriate in the range of 0.1 mol/L to 2.0 mol/L. Depending on the case, only water may be used.

In the acid treatment process, the temperature of the aqueous acid solution may be set in the range of room temperature to 100° C. and the treatment time may be set to about 1 hour to 500 hours.

In general, it is suitable to perform treatment with the aqueous acid solution, the aqueous alkaline solution, or the like (etching process 1), and then perform water treatment (etching process 2). By performing the water treatment, residual components in the porous glass skeleton may be removed, so that a more stable porous body (porous glass) tends to obtain.

The temperature in the water treatment process is generally suitably in the range of room temperature to 100° C. The water treatment process time may be suitably determined as appropriate in accordance with the composition, size, or the like of the target glass and may be usually set to 1 hour to 50 hours.

Moreover, a plurality of times of etching processes may be performed as required.

EXAMPLES

First, various evaluation methods in Example 1 to Example 3 are described.

Measurement Method of Glass Transition Point (Tg) of Glass Powder

The glass transition point (Tg) of glass powder is measured from the DTA curve measured by a differential type differential thermal balance (TG-DTA). As a measuring apparatus, Thermoplus TG8120 (Rigaku Corporation) may be used, for example.

Specifically, the glass powder was heated at a temperature elevation rate of 10° C./minute from room temperature using a platinum pan to thereby measure the DTA curve. In the curve, the endothermic initiation temperature at the endothermic peak was determined by extrapolation by a tangent method to be used as the glass transition point (Tg).

Measurement Method of Crystallization Temperature

The crystallization temperature of glass powder is calculated as follows.

The glass powder is heat-treated at 300° C. for 1 hour. The obtained sample was evaluated by an X ray diffraction structure analysis apparatus (XRD). When the peak obtained from the crystal was not observed, another glass powder was heat-treated at 350° C. which was 50° C. higher for 1 hour and evaluated by the XRD.

The operation was repeated until the crystal was confirmed, and the temperature at which the peak obtained from the crystal was confirmed was defined as the crystallization temperature. As a measuring apparatus, RINT2100 (Rigaku Corporation) may be used as the XRD, for example.

Measurement Method of Porosity

Treatment for binarizing an electronograph at a skeleton portion and a pore portion was performed. Specifically, the surface of the porous glass is observed at a magnification of 100,000 times (depending on the case, 50,000 times) at which the contrast of the skeleton is easily observed at an accelerating voltage of 5.0 kV using a scanning electron microscope (FE-SEM S-4800, manufactured by Hitachi).

Figure 12:
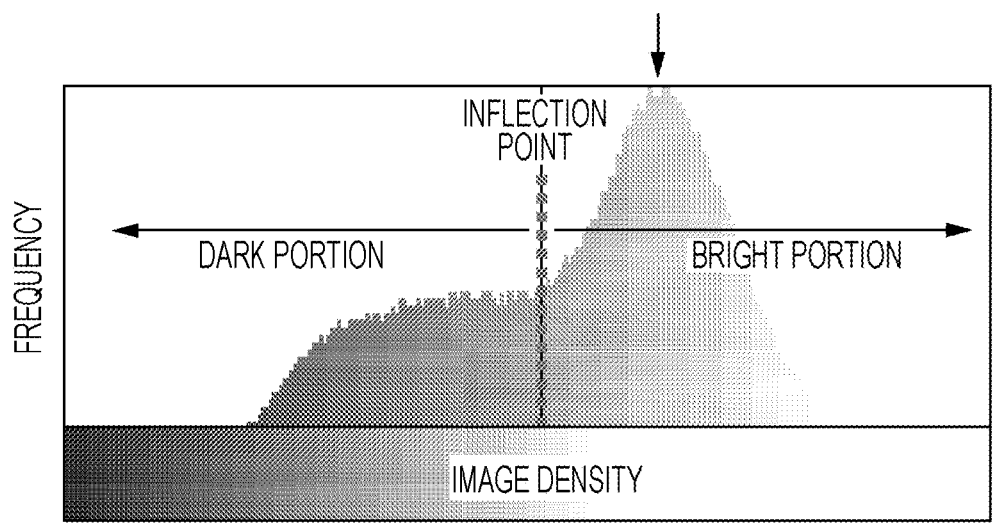
FIG. 12 is a view explaining the porosity.

The observed image is saved as an image, and then the SEM image is graphed at the frequency of each image density using an image analyzing software. FIG. 12 is a view illustrating the frequency of each image density of the porous body of the spinodal type phase separation structure. The peak portion indicated by the downward arrow of the image density of FIG. 12 represents the skeleton portion located at the front.

The bright portion (skeleton portion) and the dark portion (pore portion) are monochromatically binarized at the inflection point near the peak position as the threshold value. The average value of the entire image for the ratio of the black portion area to the entire area (total of the white portion area and the black portion area) was determined to be used as the porosity.

Measurement Method of Pore Diameter and Skeleton Diameter

Images (electronographs) were taken at magnifications of 50,000 times, 100,000 times, and 150,000 times at an accelerating voltage of 5.0 kV using a scanning electron microscope (FE-SEMS-4800, manufactured by Hitachi). 30 or more points of the width of the pore portions of the porous body were measured from the taken images, and the average value was defined as the pore diameter.

Similarly, 30 or more points of the width of skeleton portions of the porous body were measured from the taken images, and the average value was used as the skeleton diameter.

Measurement Method of Glass Layer Thickness

SEM images (electronographs) were taken at magnifications of 10,000 times to 150,000 times at an accelerating voltage of 5.0 kV using a scanning electron microscope (FE-SEMS-4800, manufactured by Hitachi). 30 or more points of the thickness of the glass layer portion on the base material were measured from the taken images, and the average value was used as the glass layer thickness.

Measurement Method of Main Elements

The measurement of the main element constituting the base material and the main elements constituting the porous glass layer may be measured by performing a quantitative analysis of the constituent elements using an X ray photoelectron spectrum apparatus (XPS), for example. As a measuring apparatus, ESCALAB 220 i-XL (manufactured by Thermo Scientific) is used.

A specific measurement method is described. First, the main elements constituting the porous glass layer are analyzed by analyzying the elements of the top surface of the structure by XPS.

Subsequently, the glass layer on the top surface is removed by an arbitrary method, such as polishing, and the removal of the glass layer is confirmed by SEM or the like. Thereafter, the XPS measurement is performed again to analyze the main elements of the base material. Or, the main elements of the base material may be analyzed by performing the XPS measurement of the base material portion of the cross section of the structure.

Measurement Method of Surface Reflectance

The surface reflectance at a wavelength of 550 nm was measured using a lens reflectance meter (manufactured by USPM-RUIII, Olympus, Inc.)

Hereinafter, the embodiment is described with reference to Examples but is not limited to Examples.

Example 1

Sodium carbonate, boric acid, and silica dioxide were used as glass raw materials, and were uniformly mixed at a composition ratio of $Na_2O:B_2O_3:SiO_2:Al_2O_3=7.3:27.2:62.5:3.0$ (% by weight). Then, the mixture was heated and melted at 1350° C. to 1450° C., and thereafter naturally cooled in a state where the mixture was molded into a plate shape, thereby obtaining an about 1 mm thick plate glass.

A base glass of a composition of $7.3Na_2O.27.2B_2O_3.62.5SiO_2.3.0Al_2O_3$ (% by weight) obtained by cutting the plate glass into about 1 cm square pieces was heated at 540° C. for 50 hours. In order to remove a surface layer, the glass was subjected to surface polishing. The glass was immersed in 1 N nitric acid warmed at 80° C. for 30 hours, and then rinsed with ion exchange water, thereby obtaining a porous glass. The results of observing the glass surface of the obtained porous glass under an electron microscope are shown in FIG. 6. It was found that the spinodal structure was formed. The skeleton diameter was 40 nm, the pore diameter was 30 nm, and the porosity was 35%.

The obtained porous body was allowed to absorb water, and then cracks caused by the water absorption was confirmed but cracks were not observed.

The obtained porous glass and a silica glass which is not a porous body were exposed to the atmosphere for 2 hours, and then a photograph of dust in a 2 cm×2 cm region was taken. Then, when the number of the dust was counted, the number of the dust adhering to the silica glass which is not a porous body was 666 but the number of the dust adhering to the obtained porous glass was 43.

The surface reflectance of the obtained porous glass was 0.6%.

Example 2

Sodium carbonate, boric acid, and silica dioxide were used as glass raw materials, and were uniformly mixed at a composition ratio of $Na_2O:B_2O_3:SiO_2:Al_2O_3=9:30.5:59:1.5$ (% by weight). Then, the mixture was heated and melted at 1350° C. to 1450° C., and then naturally cooled in a state where the mixture was molded into a plate shape, thereby obtaining an about 1 mm thick plate glass.

A base glass of a composition of $9Na_2O.30.5B_2O_3.59SiO_2.1.5Al_2O_3$ (% by weight) obtained by cutting the plate glass into about 1 cm square pieces was phase separated at 560° C. for 25 hours. In order to remove a surface layer, the glass was subjected to surface polishing. The glass was immersed in 1 N nitric acid warmed at 80° C. for 50 hours, and then rinsed with ion exchange water, thereby obtaining a porous glass. When observing the glass surface of the obtained porous glass under an electron microscope, it was found that the spinodal structure was formed similarly as in Example 1. The skeleton diameter was 35 nm, the pore diameter was 50 nm, and the porosity was 55%.

The obtained porous glass and a silica glass which is not a porous body were exposed to the atmosphere for 2 hours, and then a photograph of dust in a 2 cm×2 cm region was taken. Then, when the number of the dust was counted, the number of the dust adhering to the silica glass which is not a porous body was 754 but the number of the dust adhering to the obtained porous glass was 55.

The surface reflectance of the obtained porous glass was 0.5%.

Example 3

Sodium carbonate, boric acid, and silica dioxide were used as glass raw materials, and were uniformly mixed at a composition ratio of $Na_2O:B_2O_3:SiO_2=9.3:28.8:62.9$ (% by weight). Then, the mixture was heated and melted at 1350° C. to 1450° C., and then naturally cooled in a state where the mixture was molded into a plate shape, thereby obtaining an about 1 mm thick plate glass.

A base glass of a composition of $9.3Na_2O.28.8B_2O_3.62.9SiO_2$ (% by weight) obtained by cutting the plate glass into about 1 cm square pieces was phase separated at 580° C. for 40 hours for phase separation. In order to remove a surface layer, the glass was subjected to surface polishing. The glass was immersed in 1 N nitric acid warmed at 80° C. for 50 hours, and then rinsed with ion exchange water, thereby obtaining a porous glass. When observing the glass surface of the obtained porous glass under an electron microscope, it was found that the spinodal structure was formed similarly as in Example 1. The skeleton diameter was 45 nm, the pore diameter was 50 nm, and the porosity was 50%.

The obtained porous glass and a silica glass which is not a porous body were exposed to the atmosphere for 2 hours, and then a photograph of dust in a 2 cm×2 cm region was taken. Then, when the number of the dust was counted, the number of the dust adhering to the silica glass which is not a porous body was 350 but the number of the dust adhering to the obtained porous glass was 36.

The surface reflectance of the obtained porous glass was 0.6%.

Next, enforcement methods and evaluation methods in Example 4 to Example 9 are described.

Production Example of Glass Powder 1

A mixed powder containing quartz powder, boron oxide, sodium oxide, and alumina was melted at 1500° C. for 24 hours using a platinum crucible in such a manner as to have a charge composition of 64% by weight $SiO_2$, 27% by weight $B_2O_3$, 6% by weight $Na_2O$, and 3% by weight $Al_2O_3$. Thereafter, the temperature of the glass was lowered to 1300° C., and then poured into a graphite mold. The mold was allowed to cool in the air for about 20 minutes, held in a 500° C. slow cooling furnace for 5 hours, and then allowed to cool over 24 hours. A block the obtained borosilicate glass was crushed using a jet mill until the average particle diameter was 4.5 µm, thereby obtaining a glass powder 1.

The crystallization temperature of the glass powder 1 was 800° C.

Production Example of Glass Powder 2

A glass powder 2 was obtained in the same manner as in the glass powder 1, except using a mixed powder containing quartz powder, boron oxide, and sodium oxide in such a manner as to have a charge composition of 63.0% by weight $SiO_2$, 28.0% by weight $B_2O_3$, and 9.0% by weight $Na_2O$.

The crystallization temperature of the glass powder 2 was 750° C.

Production Example of Glass Paste 1

| | |
|---|---|
| Glass powder 1 | 60.0 parts by mass |
| α-terpineol | 44.0 parts by mass |
| Ethyl cellulose (Registered trade mark: ETHOCEL Std 200 (manufactured by Dow Chemical Co.)) | 2.0 parts by mass |

The raw materials were stirred and mixed, thereby obtaining a glass paste 1. The viscosity of the glass paste 1 was 31300 mPa·s.

Production Example of Glass Paste 2

A glass paste 2 was obtained in the same method as in the glass paste 1, except using the glass powder 2 in place of the glass powder 1. The viscosity of the glass paste 2 was 38000 mPa·s.

Examples of Base Materials 1 to 4

A quartz substrate (manufactured by IIYAMA PRECISION GLASS Co., Ltd., Softening point: 1700° C.) was used as a base material 1.

A sapphire substrate (manufactured by Techno Chemics, Melting point: 2030° C.) was used as a base material 2.

A glass substrate (Registered trade mark 7059, manufactured by Corning, Inc., Softening point: 844° C.) was used as a base material 3.

A glass substrate (Registered trade mark S-TIM 1, manufactured by Ohara Inc., Softening point: 699° C.) was used as a base material 4.

Three pieces of each substrate having a thickness of 1.1 mm which was cut into a size of 50 mm×50 mm, and then subjected to mirror finish were used.

Production Example of Structure 1

The glass paste 1 was applied onto the base material 1 by screen printing. As a printing machine, MT-320TV manufactured by MICRO-TEC Co., Ltd. was used. As a plate, a solid image of 30 mm×30 mm of #500 was used.

Subsequently, the resultant substance was allowed to stand still in a 100° C. drying furnace for 10 minutes to dry the solvent. The film thickness of the formed film was 10.00 µm as measured by SEM.

As a heat treatment process 1, the temperature was increased to 700° C. at a temperature elevation rate of 20° C./min, and then the film was heat-treated for 1 hour. Thereafter, as a heat treatment process 2, the temperature was lowered to 600° C. at a temperature lowering rate of 10° C./min, and then the film was heat-treated at 600° C. for 50 hours. Then, the top surface of the film was polished, thereby obtaining a phase separable glass layer 1.

The phase separable glass layer 1 was immersed in a an aqueous 1.0 mol/L nitric acid solution heated to 80° C., and then allowed to stand still at 80° C. for 24 hours. Subsequently, the glass layer was immersed in distilled water heated to 80° C., and then allowed to stand still for 24 hours. Then, a glass body was taken out from the aqueous solution, dried at room temperature for 12 hours, thereby obtaining a structure 1 in which a porous glass film was formed on a base material.

When the film thickness was observed by SEM, the formation of a uniform film having a film thickness of 7.00 µm was confirmed. The manufacturing conditions of the structure 1 are shown in Table 1. The measurement results of each evaluation of the obtained structure 1 are shown in Table 2.

Production Example of Structure 2

A structure 2 in which a porous glass film was formed on a base material was obtained in the same manner as in the structure 1, except extending the polishing time of the top surface of the film when producing the phase separable glass layer 1. The film thickness was 0.09 µm as observed by SEM. The measurement results of each evaluation of the obtained structure 2 are shown in Table 2.

Production Example of Structures 3 to 5

Structures 3 to 5 in which a porous glass film was formed on a base material were obtained in the same manner as in the structure 1, except changing the production conditions as shown in Table 1. The measurement results of each evaluation of the obtained structures are shown in Table 2.

Production Example of Structure 6

A structure 6 in which a porous glass film was formed on a base material was obtained in the same manner as in the structure 1, except changing the base material to be used from the base material 1 to the base material 2. The measurement results of each evaluation of the obtained structure 6 are shown in Table 2.

TABLE 1

| | | Structure 1 | Structure 2 | Structure 3 | Structure 4 | Structure 5 | Structure 6 |
|---|---|---|---|---|---|---|---|
| Substrate | Type | Base material 1 | Base material 1 | Base material 1 | Base material 1 | Base material 1 | Base material 2 |
| | Softening point (Melting point) | 1700 | 1700 | 1700 | 1700 | 1700 | 2030 |
| Paste | Type | Paste 1 | Paste 1 | Paste 1 | Paste 2 | Paste 2 | Paste 1 |
| | Softening temperature | 470 | 470 | 470 | 500 | 500 | 470 |

TABLE 1-continued

|  |  |  | Structure 1 | Structure 2 | Structure 3 | Structure 4 | Structure 5 | Structure 6 |
|---|---|---|---|---|---|---|---|---|
| Heat treatment conditions |  | Crystallization temperature | 800 | 800 | 800 | 750 | 750 | 800 |
|  | Heat treatment process 1 | Temperature (° C.) | 700 | 700 | 700 | 700 | 700 | 700 |
|  |  | Time (hr) | 1 | 1 | 1 | 1 | 1 | 1 |
|  | Heat treatment process 2 | Temperature (° C.) | 600 | 600 | 575 | 600 | 620 | 600 |
|  |  | Time (hr) | 50 | 50 | 25 | 50 | 50 | 50 |
|  | Phase separation temperature (° C.) |  | 700 | 700 | 700 | 700 | 700 | 700 |

TABLE 2

|  |  | Structure 1 | Structure 2 | Structure 3 | Structure 4 | Structure 5 | Structure 6 |
|---|---|---|---|---|---|---|---|
| Substrate | Type | Base material 1 | Base material 1 | Base material 1 | Base material 1 | Base material 1 | Base material 2 |
|  | Main element | Si | Si | Si | Si | Si | Al |
|  | Softening point (Melting point) | 1700 | 1700 | 1700 | 1700 | 1700 | 2030 |
|  | Young's modulus (GPa) | 72 | 72 | 72 | 72 | 72 | 470 |
| Glass film | Main element | Si | Si | Si | Si | Si | Si |
|  | Porosity (%) | 52 | 52 | 34 | 66 | 72 | 53 |
|  | Pore diameter (nm) | 45 | 45 | 15 | 90 | 120 | 42 |
|  | Skeleton diameter (nm) | 30 | 30 | 30 | 60 | 80 | 32 |
|  | Film thickness (μm) | 7.00 | 0.09 | 6.90 | 6.60 | 6.60 | 7.00 |

Example 4

The obtained structure 1 was evaluated by the following evaluation measures.

Evaluation of Fine Pore Structure

SEM images (electronographs) were taken at magnifications of 10,000 to 150,000 times at an accelerating voltage of 5.0 kV using a scanning electron microscope (FE-SEMS-4800, manufactured by Hitachi). From the taken images, a continuous fine pore structure by spinodal type phase separation was judged.

Rank A: A continuous fine pore structure by spinodal type phase separation is confirmed.

Rank B: A continuous fine pore structure by spinodal type phase separation is not confirmed.

Evaluation of Structure Distortion

The structure distortion was evaluated according to the following judgment criterion. The structure was placed on a flat stand, and the distortion was judged by whether or not the structure curves.

Rank A: Curvature of structure is not confirmed.

Rank B: Curvature of structure is confirmed.

Evaluation of Strength

The strength of the structure was evaluated by whether or not the structure was destroyed when 10 mm portions of the sides facing each other of the obtained structure were fixed, and a 100 g weight of an area of 10 mm×10 mm was placed at the center of the structure.

Rank A: The structure is not destroyed.

Rank B: The structure is destroyed.

Evaluation of Film Adhesion

The interface of the porous glass layer portion and the base material of the obtained structure was observed using SEM to thereby evaluate the film adhesion. The evaluation criteria are as follows.

As an apparatus, a field emission scanning electron microscope S-4800 (trade name) manufactured by Hitachi High-Technologies Corporation was used, the observation was performed at a magnification of 150000 times at an accelerating voltage of 5.0 kV. Specifically, the film adhesion was judged by whether or not the interface of the skeleton portion of the porous glass layer and the base material is observed.

Rank A: The interface of the porous glass skeleton portion and the base material is not observed.

Rank B: The interface of the porous glass skeleton portion and the base material is clearly observed.

Dustproof Evaluation

One sheet of the structure 4 and a 5 cm×5 cm silica glass which is not a porous body were exposed to the atmosphere for 4 hours, and thereafter, a 20 mm×20 mm region was photographed, and the number of dust in the region was counted.

Rank A: The number of the dust is 1/10 or lower relative to the number of the dust on the silica glass.

Rank B: The number of the dust is larger than 1/10 and smaller than 1/5 relative to the number of the dust on the silica glass.

Rank C: The number of the dust is 1/5 or more relative to the number of the dust on the silica glass.

Examples 5 to 9

The structures 2 to 6 were evaluated by the same evaluation measure as that of Example 4. The evaluation results are shown in Table 3.

TABLE 3

|  | Example 4 Structure 1 | Example 5 Structure 2 | Example 6 Structure 3 | Example 7 Structure 4 | Example 8 Structure 5 | Example 9 Structure 6 | Silica Glass |
|---|---|---|---|---|---|---|---|
| Pore structure | A | A | A | A | A | A |  |
| Structure distortion | A | A | A | A | A | A |  |
| Strength | A | A | A | A | A | A |  |
| Film adhesion | A | A | A | A | A | B |  |
| Dustproof properties | A | A | A | B | B | A | C |

Example 10

A porous glass was obtained by the same process as in Example 1, except heating a base glass at 520° C. for 80 hours for phase separation. When the glass surface of the obtained porous glass was observed under an electron microscope, it was found that the spinodal structure was formed similarly as in Example 1. The skeleton diameter was 10 nm, the pore diameter was 20 nm, and the porosity was 35%.

The obtained porous glass and the silica glass which is not a porous body were exposed to the atmosphere for 2 hours, and then dust in a 2 cm×2 cm region was photographed. When the number of the dust was counted, the number of the dust adhering to the silica glass which is not a porous body was 620 and, in contrast, the number of the dust adhering to the obtained porous glass was 20.

The surface reflectance of the obtained porous glass was 0.8%.

Example 11

A porous glass was obtained by the same process as in Example 1, except heating a base glass at 600° C. for 30 hours for phase separation. When the glass surface of the obtained porous glass was observed under an electron microscope, it was found that the spinodal structure was formed similarly as in Example 1. The skeleton diameter was 70 nm, the pore diameter was 60 nm, and the porosity was 60%.

The obtained porous glass and the silica glass which is not a porous body were exposed to the atmosphere for 2 hours, and then dust in a 2 cm×2 cm region was photographed. When the number of the dust was counted, the number of the dust adhering to the silica glass which is not a porous body was 620 and, in contrast, the number of the dust adhering to the obtained porous glass was 100.

The surface reflectance of the obtained porous glass was 0.5%.

Example 12

A porous glass was obtained by the same process as in Example 1, except heating a base glass at 470° C. for 25 hours for phase separation. When the glass surface of the obtained porous glass was observed under an electron microscope, it was found that the spinodal structure was formed similarly as in Example 1. The skeleton diameter was 2 nm and the pore diameter was 6 nm. The porosity was unmeasurable.

The obtained porous glass and the silica glass which is not a porous body were exposed to the atmosphere for 2 hours, and then dust in a 2 cm×2 cm region was photographed. When the number of the dust was counted, the number of the dust adhering to the silica glass which is not a porous body was 623 and, in contrast, the number of the dust adhering to the obtained porous glass was 175. It is considered that since the skeleton diameter was small and dust was attached over two or more skeletons, the number of the dust adhering thereto was larger than that of Examples 1 and 11.

The surface reflectance of the obtained porous glass was 1.2%.

Example 13

A porous glass was obtained by the same process as in Example 1, except heating a base glass at 610° C. for 50 hours for phase separation. When the glass surface of the obtained porous glass was observed under an electron microscope, it was found that the spinodal structure was formed similarly as in Example 1. The skeleton diameter was 100 nm, the pore diameter was 100 nm, and the porosity was 70%.

The obtained porous glass and the silica glass which is not a porous body were exposed to the atmosphere for 2 hours, and then dust in a 2 cm×2 cm region was photographed. When the number of the dust was counted, the number of the dust adhering to the silica glass which is not a porous body was 600 and, in contrast, the number of the dust adhering to the obtained porous glass was 180.

The surface reflectance of the obtained porous glass was 0.6%.

The above results showed that the structures having the spinodal type structure had high strength and a high dustproof effect. It was also found that the structures having a skeleton diameter of 5 nm or more and 80 nm or lower had a high dustproof effect.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An imaging apparatus comprising:
    an imaging element; and
    a porous body having a three-dimensional skeleton,
    wherein a plurality of continuous pores in three dimensions is in the porous body.

2. The imaging apparatus according to claim 1, wherein an average diameter of the skeleton is 5 nm or more and 80 nm or lower.

3. The imaging apparatus according to claim 1, wherein an average diameter of the skeleton is 5 nm or more and 50 nm or lower.

4. The imaging apparatus according to claim 1, wherein an average diameter of the pores is 5 nm or more and 500 nm or lower.

5. The imaging apparatus according to claim 1, wherein a porosity of the porous body is 10% or more and 90% or lower.

6. The imaging apparatus according to claim 1, wherein the skeleton contains silicon oxide.

7. The imaging apparatus according to claim 1, further comprising a base material on which the porous body is disposed.

8. The imaging apparatus according to claim 7, wherein the base material contains crystal, sapphire or quartz glass.

9. The imaging apparatus according to claim 1, further comprising an optical filter,
wherein the optical filter is at least one of a low pass filter and an infrared cut filter.

10. The imaging apparatus according to claim 1, further comprising an optical filter,
wherein the porous body, the optical filter and the imaging element are arranged in this order.

11. The imaging apparatus according to claim 1, further comprising a device for removing a foreign substance.

12. The imaging apparatus according to claim 11, wherein the device is disposed between the imaging element and the porous body.

13. The imaging apparatus according to claim 11, wherein the device comprises a vibration member and is disposed in such a manner that the vibration member contacts the porous body.

14. The imaging apparatus according to claim 11, further comprising an optical filter,
wherein the porous body is arranged on an opposite side of the imaging element with respect to the optical filter, and
wherein the device comprises a vibration member and is disposed in such a manner that the vibration member contacts the optical filter.

15. An image forming apparatus, comprising:
an optical apparatus used for forming an image by emitting light; and
a porous body provided in the optical apparatus,
wherein the porous body has a three-dimensional skeleton,
wherein a plurality of continuous pores in three dimensions is in the porous body.

16. The image forming apparatus according to claim 15, wherein an average diameter of the skeleton is 5 nm or more and 80 nm or lower.

17. The imaging apparatus according to claim 15, wherein an average diameter of the pores is 5 nm or more and 500 nm or lower.

18. The image forming apparatus according to claim 15, further comprising a base material on which the porous body is disposed.

19. The image forming apparatus according to claim 18, wherein the base material contains crystal, sapphire or quartz glass.

20. The imaging forming apparatus according to claim 15, further comprising a device for removing a foreign substance.

21. An imaging apparatus comprising:
an imaging element;
a porous body having a three-dimensional skeleton; and
an optical filter,
wherein the optical filter is at least one of a low pass filter and an infrared cut filter, and
wherein a plurality of continuous pores in three dimensions is in the porous body.

22. An image forming apparatus, comprising:
an optical apparatus used for forming an image by emitting light;
a porous body provided in the optical apparatus; and
a device for removing a foreign substance,
wherein the porous body has a three-dimensional skeleton,
wherein a plurality of continuous pores in three dimensions is in the porous body.

23. The imaging apparatus according to claim 7, wherein the base material has curvature.

24. The imaging apparatus according to claim 18, wherein the base material has curvature.

25. The imaging apparatus according to claim 21, wherein the base material has curvature.

26. The imaging apparatus according to claim 22, wherein the base material has curvature.

* * * * *